US010450442B2

(12) United States Patent
Pfaendner et al.

(10) Patent No.: US 10,450,442 B2
(45) Date of Patent: Oct. 22, 2019

(54) USE OF ORGANIC OXYIMIDE SALTS AS FLAME RETARDANTS, FLAME-RETARDANT PLASTIC COMPOSITIONS, METHOD FOR THE PRODUCTION THEREOF AND MOULDED PART, PAINT OR COATING

(71) Applicant: FRAUNHOFER-GESELLSCHAFT ZUR FÖRDERUNG DER ANGEWANDTEN FORSCHUNG E.V., München (DE)

(72) Inventors: Rudolf Pfaendner, Rimbach (DE); Markus Mazurowski, Ginsheim-Gustav (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 235 days.

(21) Appl. No.: 15/511,410

(22) PCT Filed: Sep. 16, 2015

(86) PCT No.: PCT/EP2015/071254
§ 371 (c)(1),
(2) Date: Mar. 15, 2017

(87) PCT Pub. No.: WO2016/042043
PCT Pub. Date: Mar. 24, 2016

(65) Prior Publication Data
US 2017/0260362 A1  Sep. 14, 2017

(30) Foreign Application Priority Data
Sep. 18, 2014  (DE) .................. 10 2014 218 810

(51) Int. Cl.
| | |
|---|---|
| C08K 5/3417 | (2006.01) |
| C08K 5/34 | (2006.01) |
| C08K 5/3492 | (2006.01) |
| C08K 5/5317 | (2006.01) |
| C08K 5/5399 | (2006.01) |
| C08K 5/56 | (2006.01) |
| C08K 5/20 | (2006.01) |
| C08K 5/3415 | (2006.01) |
| C08K 5/53 | (2006.01) |
| C08K 5/5393 | (2006.01) |
| C09K 21/10 | (2006.01) |
| C09K 21/12 | (2006.01) |
| C09K 21/02 | (2006.01) |
| C09K 21/04 | (2006.01) |
| C09K 21/08 | (2006.01) |
| C09K 21/14 | (2006.01) |
| C08L 23/12 | (2006.01) |
| C08L 101/00 | (2006.01) |
| C08L 39/04 | (2006.01) |
| C08K 5/32 | (2006.01) |

(52) U.S. Cl.
CPC .............. *C08K 5/3417* (2013.01); *C08K 5/32* (2013.01); *C08K 5/3415* (2013.01); *C08K 5/34928* (2013.01); *C08K 5/5317* (2013.01); *C08K 5/5393* (2013.01); *C08K 5/5399* (2013.01); *C08K 5/56* (2013.01); *C08L 23/12* (2013.01); *C09K 21/10* (2013.01); *C09K 21/12* (2013.01)

(58) Field of Classification Search
CPC .. C08K 5/32; C08K 5/34–3467; C09K 21/10; C07D 207/36–416; C07D 211/84–90; C07D 211/94; C07D 213/89; C07D 251/30–34; C07D 239/80; C07D 239/84; C07D 265/26
See application file for complete search history.

(56) References Cited

U.S. PATENT DOCUMENTS

| | | | |
|---|---|---|---|
| 2,682,522 A | 6/1954 | Coover et al. | |
| 2,716,101 A | 8/1955 | Coover et al. | |
| 2,891,915 A | 6/1959 | McCormack et al. | |
| 3,326,852 A | 6/1967 | Thomas | |
| 3,442,854 A | 5/1969 | Curtius et al. | |
| 3,919,363 A | 11/1975 | Ura et al. | |
| 3,946,093 A | 3/1976 | Koto et al. | |
| 4,218,332 A | 8/1980 | Schwab et al. | |
| 4,328,174 A | 5/1982 | Schmidt et al. | |
| 4,331,614 A | 5/1982 | Schmidt et al. | |
| 4,374,971 A | 2/1983 | Schmidt et al. | |
| 4,415,719 A | 11/1983 | Schmidt et al. | |
| 5,216,113 A | 6/1993 | Schulz-Schlitte et al. | |

(Continued)

FOREIGN PATENT DOCUMENTS

| CN | 101056893 A | 10/2007 |
|---|---|---|
| DE | 102013005307 A1 | 9/2014 |

(Continued)

OTHER PUBLICATIONS

Partial machine translation of JP-63096654-A (Year: 2019).*

(Continued)

*Primary Examiner* — Kregg T Brooks
(74) *Attorney, Agent, or Firm* — Leydig, Voit & Mayer, Ltd.

(57) ABSTRACT

The invention relates to the use of organic oxyimide salts as flame retardants for plastics and to a corresponding flame retardant plastic composition. The invention also relates to a method for producing said type of plastic composition or a molded part produced therefrom, a molding compound, a molded part, paint or a coating.

15 Claims, No Drawings

(56) References Cited

U.S. PATENT DOCUMENTS

| | | | |
|---|---|---|---|
| 5,334,692 | A | 8/1994 | Hess et al. |
| 5,690,994 | A * | 11/1997 | Robinson ............... G03C 1/91 427/171 |
| 6,288,210 | B1 | 9/2001 | Shobha et al. |
| 6,291,630 | B1 | 9/2001 | König et al. |
| 6,861,499 | B2 | 3/2005 | Vinciguerra et al. |
| 7,723,399 | B2 | 5/2010 | Nesvadba et al. |
| 7,816,486 | B2 | 10/2010 | Freitag et al. |
| 2005/0020800 | A1 | 1/2005 | Levchik et al. |
| 2007/0219295 | A1 | 9/2007 | Levchik et al. |
| 2008/0045673 | A1 | 2/2008 | Piotrowski et al. |
| 2008/0132600 | A1 | 6/2008 | Nesvadba et al. |

FOREIGN PATENT DOCUMENTS

| | | | |
|---|---|---|---|
| DE | 102014210214 | A1 | 12/2015 |
| EP | 2 450 401 | A1 | 5/2012 |
| JP | S50-64338 | A | 5/1975 |
| JP | 63096654 | A * | 4/1988 ............... G03C 1/30 |
| WO | WO 99/00450 | A1 | 1/1999 |
| WO | WO 03/070736 | A1 | 8/2003 |
| WO | WO 2005/030852 | A2 | 4/2005 |
| WO | WO 2006/051047 | A1 | 5/2006 |
| WO | WO 2006/084488 | A1 | 8/2006 |
| WO | WO 2006/084489 | A1 | 8/2006 |
| WO | WO 2008/101845 | A1 | 8/2008 |
| WO | WO 2010/135398 | A1 | 11/2010 |
| WO | WO 2011/000019 | A1 | 1/2011 |
| WO | WO 2013/020696 | A2 | 2/2013 |
| WO | WO 2013/068437 | A2 | 5/2013 |
| WO | WO 2013/072295 | A1 | 5/2013 |
| WO | WO 2014/154636 | A1 | 10/2014 |

OTHER PUBLICATIONS

Aubert et al., "Azoalkanes—novel flame retardants and their structure-property relationship," *Polym. Adv. Technol.* 22(11): 1529-1538 (2011).

Aubert et al., "Azoalkanes—A Novel Class of Additives for Cross-Linking and Controlled Degradation of Polyolefins," *Macromolecular Materials and Engineering*. 292: 707-714 (2007).

Dekamin et al., "The Performance of Phthalimide-N-oxyl Anion", *Chemical Monthly*, 137(12): 1591-1595 (2006).

Pawelec et al., "Triazene compounds as a novel and effective class of flame retardants for polypropylene," *Polym. Degrad. Stab.* 87(6): 948-954 (2012).

Wilén et al., "Improving weathering resistance of flame-retarded polymers," *Journal of Applied Polymer Science* 129(3):925-944 (2013).

European Patent Office, International Search Report and Written Opinion issued in International Application No. PCT/EP2015/071254 (dated Dec. 7, 2015).

International Bureau of WIPO, International Preliminary Report on Patentability issued in International Application No. PCT/EP2015/071254 (dated Mar. 30, 2017).

Aubert et al., "Versatile bis(1-alkoxy-2,2,6,6-tetramethylpiperidin-4-yl)-diazenes (AZONORs) and related structures and their utilization as flame retardants in polypropylene, low density polyethylene and high-impact polystyrene," *Polymer Degradation and Stability*, 97(8): 1438-1446 (2012).

Nicolas et al., "Azoalkanes: A Novel Class of Flame Retardants," *Macromolecular Rapid Communications*, 27(12): 976-981 (2006).

Tirri et al., "Novel tetrapotassium azo diphosphonate (INAZO) as flame retardant for polyurethane adhesives," *Polymer Degradation and Stability*, 97(3): 375-382 (2012).

China National Intellectual Property Administration, First Office Action in Chinese Patent Application No. 201580050046.7 (dated Jan. 30, 2019).

U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,445, filed Mar. 15, 2017.
U.S. Appl. No. 15/511,471, filed Mar. 15, 2017.
U.S. Appl. No. 15/529,026, filed May 23, 2017.

* cited by examiner

USE OF ORGANIC OXYIMIDE SALTS AS FLAME RETARDANTS, FLAME-RETARDANT PLASTIC COMPOSITIONS, METHOD FOR THE PRODUCTION THEREOF AND MOULDED PART, PAINT OR COATING

CROSS-REFERENCE TO RELATED APPLICATIONS

This patent application is the U.S. national phase of International Application No. PCT/EP2015/071254, filed on Sep. 16, 2015, which claims the benefit of German Patent Application No. 10 2014 218 810.5, filed Sep. 18, 2014, the disclosures of which are incorporated herein by reference in their entireties for all purposes.

The present invention relates to the use of salts of organic oxyimides as flame retardant for plastic materials and also to a correspondingly flame-retardant plastic material moulding compound. In addition, the present invention relates to a production method for such a plastic material moulding compound or to a moulding part, paint or a coating produced herefrom.

Most plastic materials are combustible and comparatively easily inflammable. In order to reduce or exclude the risk of fire to plastic materials in specific applications, it is therefore absolutely necessary to reduce the flammability and to use flameproof plastic material compositions. For this purpose, generally flame retardants are added to the plastic material with the aim of inhibiting ignition for a specific time or significantly delaying the spread of fire. Traditional flame retardants are based on chlorine- and bromine-containing compounds (the latter generally in combination with antimony trioxide), on phosphorus-containing, on nitrogen-containing compounds and on metal hydroxides, such as aluminium hydroxide (ATH) or magnesium hydroxide (MDH). In recent times, halogen-free flame-retardant solutions are preferred for toxicological and ecotoxicological reasons.

For the production of flame-retardant plastic materials, there is a large number of flame retardants which are used generally substrate-specifically for a specific polymer and a specific field of use, corresponding to the national and international standards which form the basis thereof. Flame-retardant plastic materials are used for example in electrical and electronic applications, in the transport field (train, aircraft, car), in textiles, in upholstered furniture and in construction.

A new flame-retardant class, developed in the last few years and based on nitrogen, preferably for polyolefins, is based on selected alkoxyamines (e.g. WO 99/00450). Due to cleavage of the alkoxyamines, radicals are produced in the case of fire, which radicals intervene in the decomposition process of the polymer and hence cause the flame-retardant effect (C. R. Wilen, R. Pfaendner, J. Appl. Pol. Sci. 2013, 129, 925-944). Apart from alkoxyamines, in the meantime, also other radical generators have been described, which act as flame retardants or as flame-retardant synergists, such as azo compounds (Nicolas et al., Macromol. Rapid Commun. 2006, 27, 976-981, WO 2005/030852), hydrazones and azines (M. Aubert et al., Pol. Adv. Technol. 2011, 22, 1529-1538), azo-alkoxyamines (M. Aubert et al. Pol. Degr. Stab. 2012, 97, 1438-1446) azo-phosphonates (T. Tirri et al., Pol. Degr. Stab. 2012, 97, 375-382) or triazenes (W. Pawelec et al., Pol. Degr. Stab. 2012, 97, 948-954).

Furthermore, the use of new radical generators based on hydroxyimides and polymeric imides as flame retardant is described in the patent application DE 10 2013 005 307 or the as yet unpublished patent application DE 10 2014 210 214.

Many of the known and mentioned radical generators do not however fulfil all requirements for an effective flame retardant, such as e.g. sufficient thermal stability, i.e. during incorporation in plastic materials (compounding) at normal temperatures, in fact an undesired decomposition of the flame retardant occurs. As a result of this premature decomposition, the effect in the case of fire is reduced and/or, as a result of subsequent reactions, the properties of the plastic material to be protected are affected negatively. The wish exists therefore for radical generators which can be used as flame retardant or flame-retardant synergists, which have sufficiently high temperature stability during plastic material processing, i.e. generally above 300° C., but then achieve a particularly good effect in the case of fire due to rapid decomposition.

It was therefore the object of the present invention to make available new flame retardants and synergistic flame-retardant components which are highly effective and have very good thermal stabilities.

This object is achieved by the use of the organic imide salts, by a flame-retardant plastic material composition, by a method for the production of a flame-retardant plastic material composition and also by a moulded part, paint or a coating described herein, and advantageous developments thereof.

The present invention hence relates to the use of organic oxyimide salts, comprising at least one structural element of subsequently illustrated formula I

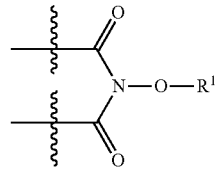

Formula I $R^1$ being selected from the group consisting of inorganic or organic cations, as flame retardant for plastic materials.

The term "organic oxyimide salts" should thereby be understood synonymously with salts which are derived from an organic oxyimide. Such organic oxyimides are described for example in the already previously mentioned German patent application DE 10 2013 005 307. For further explanation of the structural principles of the organic oxyimides, reference is made to the entire content of this patent application. From these organic oxyimides, the salts of the organic oxyimides, which are used according to the invention, ergo the organic oxyimide salts, can be prepared for example by conversion with a base.

Preferred cations $R^1$ are described in the following.

The inorganic cations are thereby selected preferably from the group consisting of metal cations, preferably monovalent, bivalent or trivalent alkali metal cations, alkaline earth metal cations, transition metal cations and/or rare earth metal cations, in particular $Na^+$, $K^+$, $Mg^{2+}$, $Ca^{2+}$, $Zn^{2+}$ and/or $Al^{3+}$.

Preferred organic cations are selected in particular from the group consisting of nitrogen and/or phosphorus-containing organic cations, in particular ammonium-, melaminiumand phosphonium cations. The organic cations can thereby be present in a low-molecular form or bonded to a polymer backbone.

Likewise, combinations of at least two different ones of the aforementioned cations are possible, i.e. the organic oxyimide salts can likewise be present as mixed salts. For example, the combination of two or more of the inorganic cations, two or more of the previously described organic cations, just as also a mixed salt which has both inorganic and organic cations, are thereby conceivable. Alternatively or additionally hereto, the salts relating to the present invention can also be present as mixed salt with at least two different anions. Hereby are for example the combination of two or more of the inorganic anions, two or more organic anions and also a mixed salt which has both inorganic and organic anions.

It is thereby particularly preferred if the organic oxyimide salt is halogen-free, i.e. the corresponding compound comprises no halogen atoms.

It is further advantageous if the organic oxyimide salt has the subsequent structure

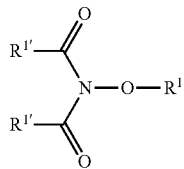

$R^1$ being defined as above and $R^{1'}$, upon each occurrence, being the same or different and representing a linear or branched alkyl-radical, a linear or branched alkylene-radical, an aromatic radical, a heteroaromatic radical or both radicals $R^{1'}$ being joined to form a ring, the ring being able to be saturated or unsaturated, substituted or unsubstituted and/or at least one or both radicals $R^{1'}$ or the radicals $R^{1'}$ joined to form a ring comprising at least one further structural element of the above illustrated formula I.

Preferred examples of organic oxyimide salts used according to the invention are described subsequently. Organic oxyimide salts which comprise only one structural element of the general formula I are conceivable. Compounds, given by way of example, are thereby selected from the subsequently illustrated compounds

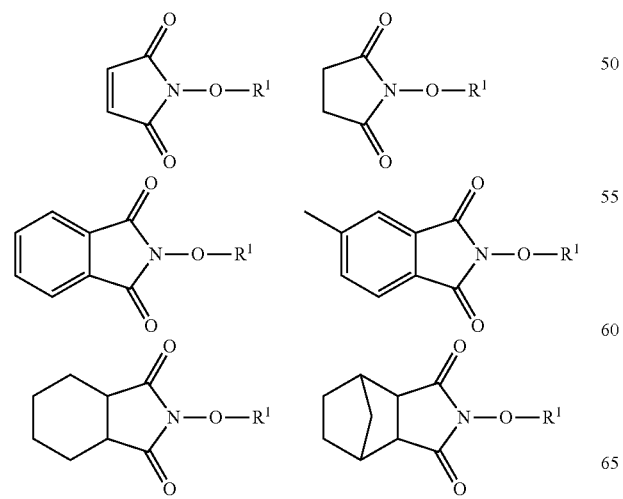

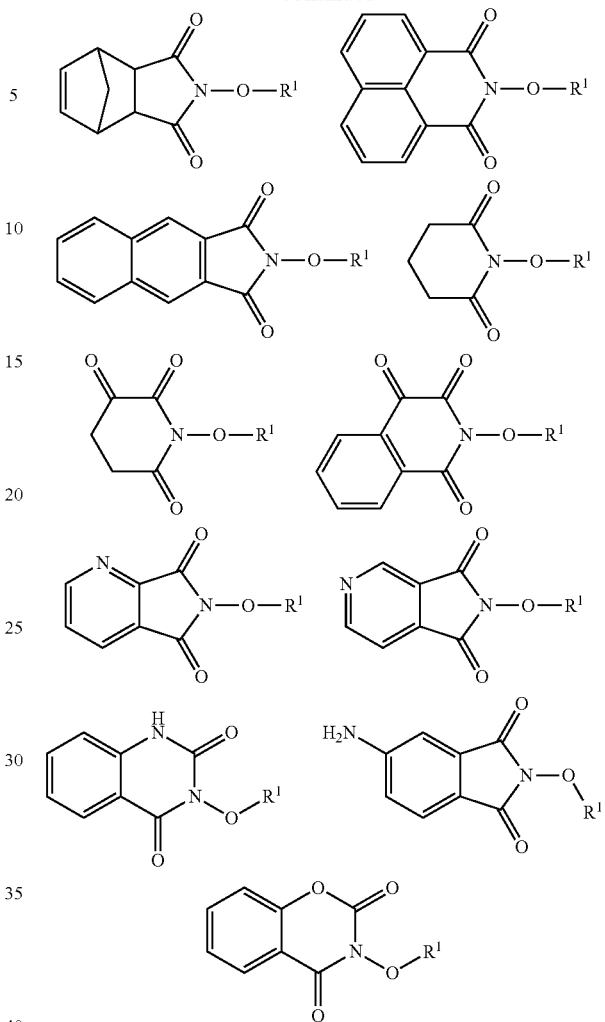

It is likewise conceivable that the oxyimide salts comprise two structural elements of the general formula I. Compounds which correspond to the subsequent structural formulae are hereby possible

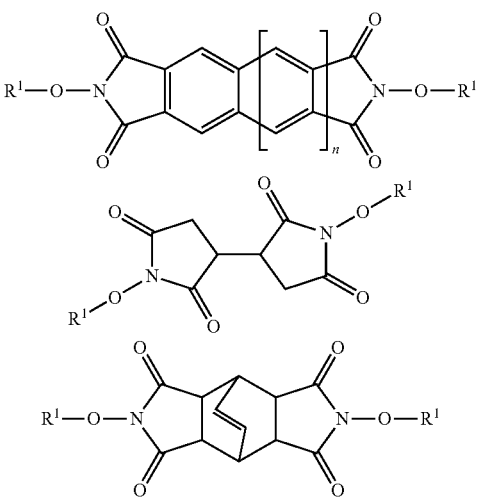

-continued

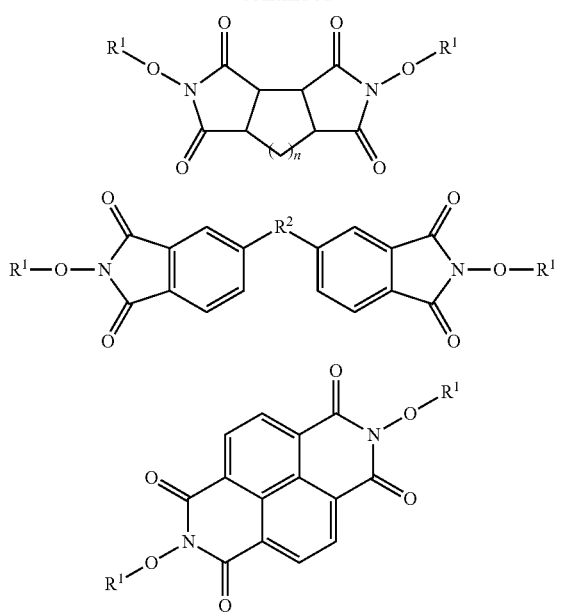

n meaning 0, 1, 2, 3 or 4, and $R^2$ being selected from the group consisting of possibly substituted alkylene-, cycloalkylene-, arylene-, heteroarylene- or bridging acyl-radicals.

The use of an oxyimide salt which has three structural elements of the general formula I is likewise conceivable, according to the subsequent formula

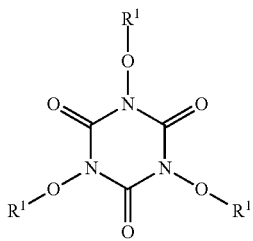

A combination or a mixture of a plurality of the previously described oxyimide salts is likewise possible.

In the oxyimide salt according to the subsequent formula

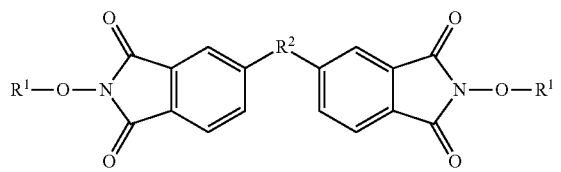

it is preferred if the moiety $R^2$ is selected from moieties of the group consisting of —$(CH_2)_n$— with n=1 to 18, —$CH(CH_3)$—, —$C(CH_3)_2$—, —$CH(CF_3)$—, —$C(CF_3)_2$—, —O—, —S—, —$SO_2$—, —NHCO—, —CO—, —O—C(O)—O— and also the subsequently illustrated groups

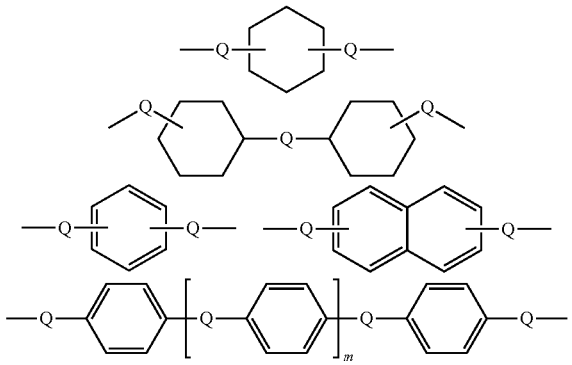

the cycloaliphatic or aromatic ring systems contained in the previously illustrated groups being unsubstituted or substituted by one or more alkyl- and/or alkoxy groups, Q upon each occurrence, being the same or different and being selected from the group consisting of a chemical bond and also the moieties —$(CH_2)_n$— with n=1 to 18, —$CH(CH_3)$—, —$C(CH_3)_2$—, —$CH(CF_3)$—, —$C(CF_3)_2$—, —O—, —S—, —$SO_2$—, —NHCO—, —CO—, —O—$O_3$—, and m being 0 or 1 to 3.

Preferably, the plastic materials to be protected are thermoplastic polymers and selected in particular from the group consisting of:

a) polymers made of olefins or diolefins, such as e.g. polyethylene (LDPE, LLDPE, VLDPE, ULDPE, MDPE, HDPE, UHMWPE), metallocene-PE (m-PE), polypropylene, polyisobutylene, poly-4-methylpentene-1, polybutadiene, polyisoprene, polycyclooctene, polyalkylene-carbon monoxide copolymers and also copolymers in the form of statistical or block structures, such as e.g. polypropylene-polyethylene (EP), EPM or EPDM, ethylene-vinyl acetate (EVA), ethylene-acrylester, such as e.g. ethylene-butylacrylate, ethylene-acrylic acid and the salts thereof (ionomers), and also terpolymers, such as e.g. ethylene-acrylic acid-glycidylacrylate, graft polymers, such as e.g. polypropylene-graft-maleic anhydride, polypropylene-graft-acrylic acid, polyethylene-graft-acrylic acid, polyethylene-polybutylacrylate-graft-maleic anhydride, b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile-acrylate (ASA), styrene-ethylene, styrene-maleic anhydride polymers including corresponding graft copolymers, such as e.g. styrene on butadiene, maleic anhydride on SBS or SEBS, and also graft copolymers made of methylmethacrylate, styrene-butadiene and ABS (MABS), c) halogen-containing polymers, such as e.g. polyvinyl chloride (PVC), polychloroprene and polyvinylidene chloride (PVDC), copolymers made of vinyl chloride and vinylidene chloride, or made of vinyl chloride and vinyl acetate, chlorinated polyethylene, polyvinylidene fluoride, d) polymers of unsaturated esters, such as e.g. polyacrylates and polymethacrylates, such as polymethylmethacrylate (PMMA), polybutylacrylate, polylaurylacrylate, polystearylacrylate, polyglycidylacrylate, polyglycidylmethacrylate, polyacrylonitrile, polyacrylamides, copolymers, such as e.g. polyacrylonitrile-polyalkylacrylate, polymethacrylimide, e) polymers made of unsaturated alcohols and derivatives, such as e.g. polyvinyl alcohol, polyvinyl acetate, polyvinyl butyral, f) polyacetals, such as e.g. polyoxymethylene (POM) or copolymers, with e.g. butanal, g) polyphenylene oxides and blends with polystyrene or polyamides, h) polymers of cyclic ethers, such as e.g. polyethylene glycol, polypropylene glycol, polyethylene oxide, polypropylene oxide, polytetrahydrofuran, i) polyurethanes made of hydroxy-terminated polyethers or polyesters and aromatic or aliphatic isocyanates, in particular linear polyurethanes, polyureas, j) polyamides, such as e.g. polyamide-6, 6.6, 6.10, 4.6, 4.10, 6.12, 12.12, polyamide 11, polyamide 12 and also (partially) aromatic polyamides, such as e.g. polyphthalamides, e.g. produced from terephthalic acid and/or isophthalic acid and aliphatic diamines or from aliphatic dicarboxylic acids, such as e.g. adipic acid or sebacic acid, and aromatic diamines, such as e.g. 1,4- or 1,3-diaminobenzene, blends of different polyamides, such as e.g. PA-6 and PA 6.6 or blends of polyamides and polyolefins, such as e.g. PA/PP, k) polyimides, polyamideimides, polyetherimides, polyesterimides, poly(ether)ketones, polysulfones, polyethersulfones, polyarylsulfones, polyphenylenesulfides, polybenzimidazoles, polyhydantoins, l) polyesters made of aliphatic or aromatic dicarboxylic acids and diols or made of hydroxycarboxylic acids, such as e.g. polyethylene terephthalate (PET), polybutylene terephthalate (PBT), polypropylene terephthalate, polyethylene naphthylate, poly-1,4-dimethylolcyclohexane terephthalate, polyhydroxybenzoate, polyhydroxynaphthalate, polylactic acid (PLA), polyhydroxybutyrate (PHB), polyhydroxyvalerate (PVH), m) polycarbonates, polyestercarbonates and also blends, such as e.g. PC/ABS, PC/PBT, PC/PET/PBT, PC/PA, n) cellulose derivatives, such as e.g. cellulose nitrate, cellulose acetate, cellulose propionate, cellulose butyrate, o) non-thermoplastic, elastomeric or duroplastic plastic materials, p) and also mixtures, combinations or blends of two or more of the previously mentioned polymers.

Provided the polymers indicated under a) to o) concern copolymers, these can be present in the form of statistical ("random"), block- or "tapered" structures.

Provided the polymers indicated under a) to o) concern stereoregular polymers, these can be present in the form of isotactic, stereotactic but also atactic forms or in stereoblock structures.

Furthermore, the polymers indicated under a) to o) can have both amorphous and (partially) crystalline morphologies.

Possibly, the polyolefins mentioned under a) to o) can also be present crosslinked, e.g. crosslinked polyethylene, which is then termed X-PE.

The mentioned polymers a) to o) can thereby be present not only as virgin material but also in the form of recyclates, e.g. as production waste or "post-consumer" recyclates.

Preferred duromeric or elastomeric, non-thermoplastic plastic materials, which are listed further back under o) and in which the present flame retardants can be used, are thereby the following:

q) epoxy resins, consisting of di- or polyfunctional epoxy compounds in combination with e.g. hardeners, based on amines, anhydrides, dicyanodiamides, mercaptans, isocyanates or catalytically acting hardeners, r) phenol resins, such as e.g. phenol-formaldehyde resins, urea-formaldehyde resins, melamine-formaldehyde resins, s) unsaturated polyester resins made of unsaturated dicarboxylic acids and diols, t) silicones, u) polyurethanes as reaction products made of di- or polyfunctional isocyanates and polyols, polyureas, v) alkyd resins, allyl resins.

For very particular preference, the flame retardants according to the invention are used in the case of polyolefins, preferably polypropylene and/or polyethylene and the copolymers and blends thereof.

For further preference, the organic oxyimide salts are used in combination with at least one further flame retardant. This at least one further flame retardant is thereby preferably selected consisting of a) inorganic flame retardants, such as e.g. $Al(OH)_3$, $Mg(OH)_2$, $AlO(OH)$, $MgCO_3$, layer silicates, such as e.g. montmorillonite or sepiolite, non- or organically modified, double salts, such as e.g. Mg—Al silicates, POSS (Polyhedral Oligomeric Silsesquioxane) compounds, huntite, hydromagnesite or halloysite and also $Sb_2O_3$, $Sb_2O_5$, $MoO_3$, zinc stannate, zinc hydroxystannate, b) nitrogen-containing flame retardants, such as e.g. melamine, melem, melam, melon, melamine derivatives, melamine condensation products or melamine salts, benzoguanamine, polyisocyanurates, allantoin, (poly)phosphacenes, in particular melamine cyanurate, melamine phosphate, dimelamine phosphate, melamine pyrophosphate, melamine polyphosphate, melamine-methane phosphonate, melamine-metal phosphates, such as e.g. melamine aluminium phosphate, melamine zinc phosphate, melamine magnesium phosphate, and also the corresponding pyrophosphates and polyphosphates, ethylene diamine methane phosphate, poly-[2,4-(piperazin-1,4,-yl]-6-(morpholin-4-yl) 3,5-triazine], ammonium polyphosphate, melamine borate, melamine hydrobromide, c) radical formers, such as e.g. alkoxyamines, hydroxylamine esters, azo compounds, dicumyl or polycumyl, hydroxyimides or the derivatives thereof, such as e.g. hydroxyimide ester or hydroxyimide ether, d) phosphorus-containing flame retardants, such as e.g. inorganic or organic phosphonates, such as e.g. aluminium phosphonate, phosphonate ester, oligomeric and polymeric derivatives of methane phosphonic acid, red phosphorus, phosphates, such as e.g. resorcin diphosphate, bisphenol-A-diphosphate and the oligomers thereof, triphenylphosphate, ethylene diamine phosphate, phosphinates, such as e.g. salts of hypophosphorous acid and the derivatives thereof, such as alkyl phosphinate salts, e.g. diethylphosphinate aluminium or diethylphosphinate zinc or aluminium phosphinate, aluminium phosphite, aluminium phosphate, 9,10-dihydro-9-oxa-10-phosphorylphenanthrene-10-oxide (DOPO) and the substituted compounds thereof, e) halogen-containing flame retardants based on chlorine and bromine, such as e.g. polybrominated diphenyl oxides, such as e.g. decabromodiphenyl oxide, tris(3-bromo-2,2-bis(bromomethyl)propylphosphate, tris(tribromoneopentyl)phosphate, tetrabromophthalic acid, 1,2-bis(tribromophenoxy)ethane, hexabromocyclododecane, brominated diphenylethane, tris-(2,3,-dibromopropyl)isocyanurate, ethylenebis(tetrabromophthalimide), tetrabromobisphenol-A-bis(2,3) dibromopropylether), tetrabromobisphenol A, brominated polystyrene, brominated polybutadiene or polystyrene-brominated polybutadiene copolymers, brominated epoxy resin, polypentabromobenzylacrylate, brominated polyphenylene ether, possibly in combination with $Sb_2O_3$ and/or $Sb_2O_5$,
f) borates, such as e.g. zinc borate or calcium borate, possibly on carrier materials such as silica,
g) sulfur-containing compounds, such as e.g. elementary sulfur, disulfides and polysulfides, thiuram sulfide, dithiocarbamates, mercaptobenzothiazole and sulfenamides,
h) antidrip agents, such as e.g. polytetrafluoroethylene,
i) silicon-containing compounds, such as e.g. polyphenylsiloxanes,
j) carbon modifications, such as e.g. carbon nanotubes (CNT) or graphene
and also combinations or mixtures hereof.

The halogen-containing flame retardants mentioned under e) frequently concern commercial products which are commercially available, e.g. from the companies Albemarle, Chemtura/Great Lakes or ICL-IP.

In particular in the case of combinations of the compounds used according to the invention according to formulae I to IV with at least one radical former as further flame retardant, synergistic effects result.

Radical formers in the sense of the present invention are compounds which can produce radicals by means of thermal and light-induced cleavage. Suitable radical formers for the applications present here are those which have sufficient thermal stability for the plastic material- or coating-processing processes, i.e. during processing, still form no or only very small quantities of radicals and produce radicals spontaneously only at higher temperatures, such as occur only in the case of fire. The respective processing processes and temperatures for coatings and plastic material processing processes are known to the person skilled in the art. Plastic material processing processes and associated temperatures can however also be obtained from the expert literature, such as e.g. H. Domininghaus, P. Elsner, P. Eyerer, T. Hirth, Kunststoffe (Plastic materials), $8^{th}$ edition, Springer 2012.

The radical former is thereby selected preferably from the group consisting of N-alkoxyamines, —C—C— radical formers, radical formers with azo groups (—N=N—), radical formers with hydrazine groups (—NH—HN—), radical formers with hydrazone groups (>C=N—NH—), radical formers with azine groups (>C=N—N=C<), radical formers with triazene groups (—N=N—N<).

The production of suitable azo compounds is described for example in M. Aubert et al. Macromol. Sci. Eng. 2007, 292, 707-714 or in WO 2008101845, the production of hydrazones and azines in M. Aubert et al., Pol. Adv. Technol. 2011, 22, 1529-1538, the production of triazenes in W. Pawelec et al., Pol. Degr. Stab. 2012, 97, 948-954.

The radical former is thereby selected for particular preference from the group consisting of
a) N-alkoxyamines according to the subsequently illustrated structural formula,

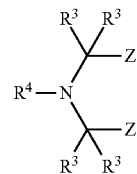

$R^3$ standing for hydrogen or a possibly substituted alkyl-, cycloalkyl-, aryl-, heteroaryl- or acyl-radical, in particular being a C1 to C4 alkyl radical,
$R^4$ standing for an alkoxy-, aryloxy-, cycloalkoxy-, aralkoxy- or acyloxy-radical,
Z standing for hydrogen or a possibly substituted alkyl-, cycloalkyl-, aryl-, heteroaryl- or acyl-radical, the two radicals Z also being able to form a closed ring which can be substituted possibly by ester-, ether-, amine-, amide-, carboxy- or urethane groups,
b) azo compounds according to the subsequently illustrated structural formulae,

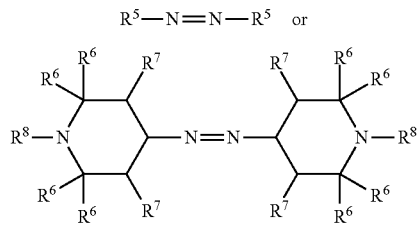

$R^5$ meaning an alkyl-, cycloalkyl- or aryl-radical,
$R^6$ upon each occurrence, being the same or different and meaning a linear or branched alkyl-radical,
$R^7$ upon each occurrence, being the same or different and meaning hydrogen or a linear or branched alkyl-radical, and
$R^8$ upon each occurrence, being the same or different and meaning an alkyl-, alkoxy-, aryloxy-, cycloalkyloxy-, aralkoxy- or acyloxy-radical,
c) dicumyl according to the subsequently illustrated structural formula

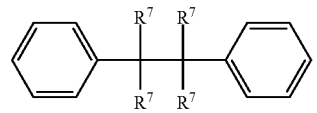

$R^7$ having the previously indicated meaning, preferably being methyl,
d) and/or polycumyl according to the subsequently illustrated structural formula

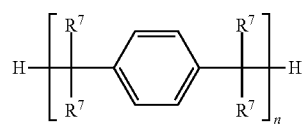

$R^7$ having the previously indicated meaning, preferably being methyl, and $2<n<100$.

Typical examples of the previously mentioned N-alkoxyamines of the indicated structure are thereby:

1-cyclohexyloxy-2,2,6,6-tetramethyl-4-octadecylamin-opiperidine; bis(1-octyloxy-2,2,6,6-tetramethylpiperidin-4-yl)sebacate; 2,4-bis[(1-cyclohexyloxy-2,2,6,6-tetramethyl-piperidin-4-yl)butylamino]-6-(2-hydroxyethylamino-S-triazine; bis(1-cyclohexyloxy-2,2,6,6-tetramethylpiperidin-4-yl)adipate; 2,4-bis[(1-cyclohexyloxy-2,2,6,6-tetramethylpiperidin-4-yl)butylamino]-6-chloro-S-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methylpropoxy)-4-octadecanoyloxy-2,2,6,6-tetramethylpiperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl)adipate; 2,4-bis{N-[1-(2-hydroxy-2-methylpropoxy)-2,2,6,6-tetramethylpiperidin-4-yl]-N-butylamino}-6-(2-hydroxyethylamino)-S-triazine); 4-piperidinol, 2,2,6,6-tetramethyl-1-(undecyloxy)-,4,4′-carbonate; the reaction product of 2,4-bis[(1-cyclohexyloxy-2,2,6,6-tetramethylpiperidin-4-yl)butylamino]-6-chloro-S-triazine with N,N′-bis(3-aminopropylethylenediamine); the oligomer compound, which is the condensation product of 4,4′-hexamethylene-bis(amino-2,2,6,6-tetramethylpiperidine) and 2,4-dichloro-6-[(1-cyclohexyloxy-2,2,6,6-tetramethyl-4-yl)butylamino]-S-triazine, closed at the ends with 2-chloro-4,6-bis(dibutylamino)-S-triazine; aliphatic hydroxylamine, such as e.g. distearyl hydroxylamine; and also compounds of the formulae.

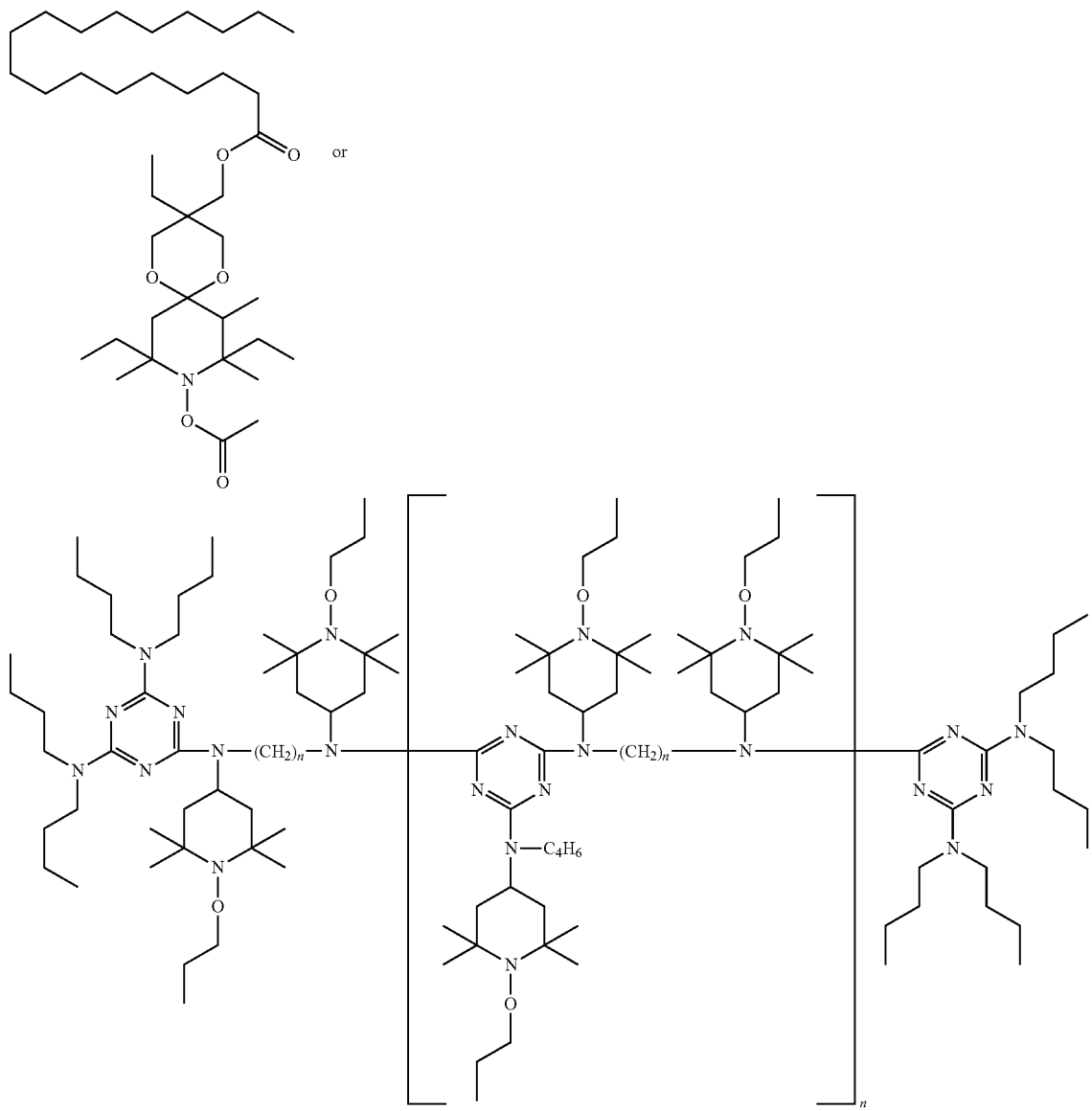

in which n=1-15.

The above-mentioned compounds are partially commercial products and are sold under the following trade names: FLAMESTAB NOR 116®, TINUVIN NOR 371®, IRGATEC CR 76® by BASF SE, Hostavin NOW® by Clariant or ADK Stab LA 81® by Adeka. Dicumyl and polycumyl are commercial products which are obtainable for example from United Initiators.

Sulfur-containing flame retardants are likewise radical formers with radical formers with disulfide- or polysulfide groups (—S—S—) or thiol groups (—S—H), and also thiuram sulfides, such as e.g. tetramethylthiuram disulfide, dithiocarbamates, such as e.g. zinc diethyldithiocarbamate or sodium dimethyldithiocarbamate, mercaptobenzothiazoles, such as e.g. 2-mercaptobenzothiazole and sulfenamides, such as e.g. N,N-dicyclohexyl-2-benzothiazolesulfenamide.

An example of a polysulfide is elementary sulfur, other polysulfides are described for example in U.S. Pat. No. 4,218,332.

Disulfides, polysulfides, thiols, thiuram sulfides, dithiocarbamates, mercaptibenzothiazoles and sulfenamides are commercially available.

Further suitable radical formers are hydroximides and the derivatives thereof such as hydroxyimide ester or hydroxyamide ether, as are described in WO 2014/154636.

The combination of the oxyimide salts according to the invention with another radical former can be in particular advantageous, since here the radical formation can be effected at different decomposition temperatures or adjusted according to requirement.

The at least one further flame retardant can be in particular also a phosphorus-containing flame retardant. Preferred phosphorus-containing flame retardants are thereby phosphinates of the following structures:

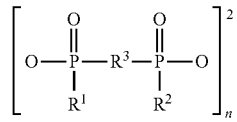

R1 and R2 preferably being identical or different and being selected from linear or branched C1-C6 alkyl and/or aryl; M being selected from the group consisting of Mg, Ca, Al, Sb, Sn, Ge, Ti, Fe, Zr, Ce, Bi, Sr, Mn, Li, Na, K, Zn and/or a protonated nitrogen base, preferably calcium ions, magnesium ions, aluminium ions and/or zinc ions; and m=1-4, preferably 2 or 3; n=1-4, preferably 1 or 3; x=1-4, preferably 1 or 2. In a particularly preferred embodiment, $R_1$=alkyl, $R_2$=alkyl and M=Al or Zn.

A particularly preferred example of a phosphinate according to the invention are the commercially available products Exolit OP® by Clariant SE.

Further preferred phosphorus-containing flame retardants are metal salts of hypophosphorous acid with a structure according to the formula

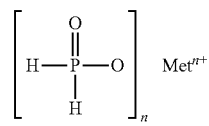

Met being a metal, selected from groups I, II, III and IV of the periodic table of elements, and n being a number from 1 to 4 which corresponds to the charge of the corresponding metal ion Met. Met is for example $Na^+$, $Ca^{2+}$, $Mg^{2+}$, $Zn^{2+}$, $Ti^{4+}$ or $Al^{3+}$, wherein $Ca^{2+}$, $Zn^{2+}$ and $Al^{3+}$ are particularly preferred.

The above-mentioned salts of hypophosphorous acid are partially commercially available, e.g. with the title Phoslite® by Italmatch Chemicals.

A further preferred group of phosphorus-containing flame retardants are phosphonates or phosphonic acid diaryl esters of a structure according to the following formula:

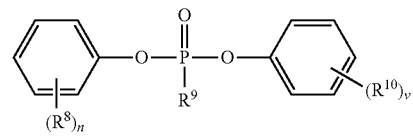

$R_8$ and $R_{10}$=H, alkyl, preferably C1-C4 alkyl, $R_9$=C1-C4 alkyl, u=1-5 and v=1-5.

Corresponding structures can also be present in the form of phosphonate oligomers, polymers and copolymers. Linear or branched phosphonate oligomers and polymers are known from the state of the art. For branched phosphonate oligomers and polymers, reference is made to the U.S. Pat. Nos. 2,716,101, 3,326,852, 4,328,174, 4,331,614, 4,374,971, 4,415,719, 5,216,113, 5,334,692, 3,442,854, 6,291,630 B1, 6,861,499 B2 and 7,816,486 B2. For phosphonate oligomers, reference is made to the US patent applications US 2005/0020800 A1, US 2007/0219295 A1 and US 2008/0045673 A1. With respect to linear phosphonate oligomers and polymers, reference is made to the US patent documents U.S. Nos. 3,946,093, 3,919,363, 6,288,210 B1, 2,682,522 and 2,891,915.

Polymeric and oligomeric phosphonates are available for example under the trade name Nofia® by FRX Polymers.

A further preferred group of phosphorus-containing flame retardants are compounds based on oxaphosphorin oxide and the derivatives thereof with for example the following structures:

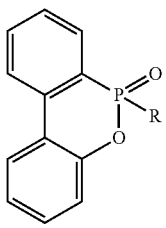

-continued
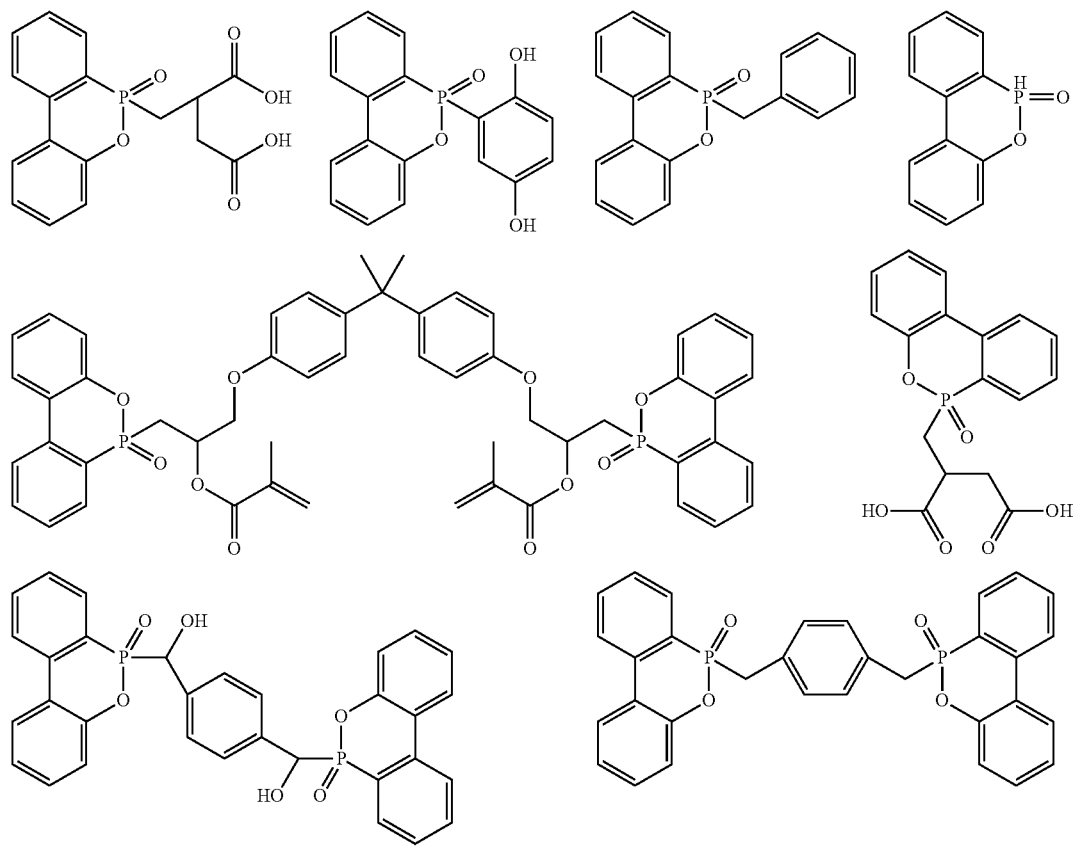
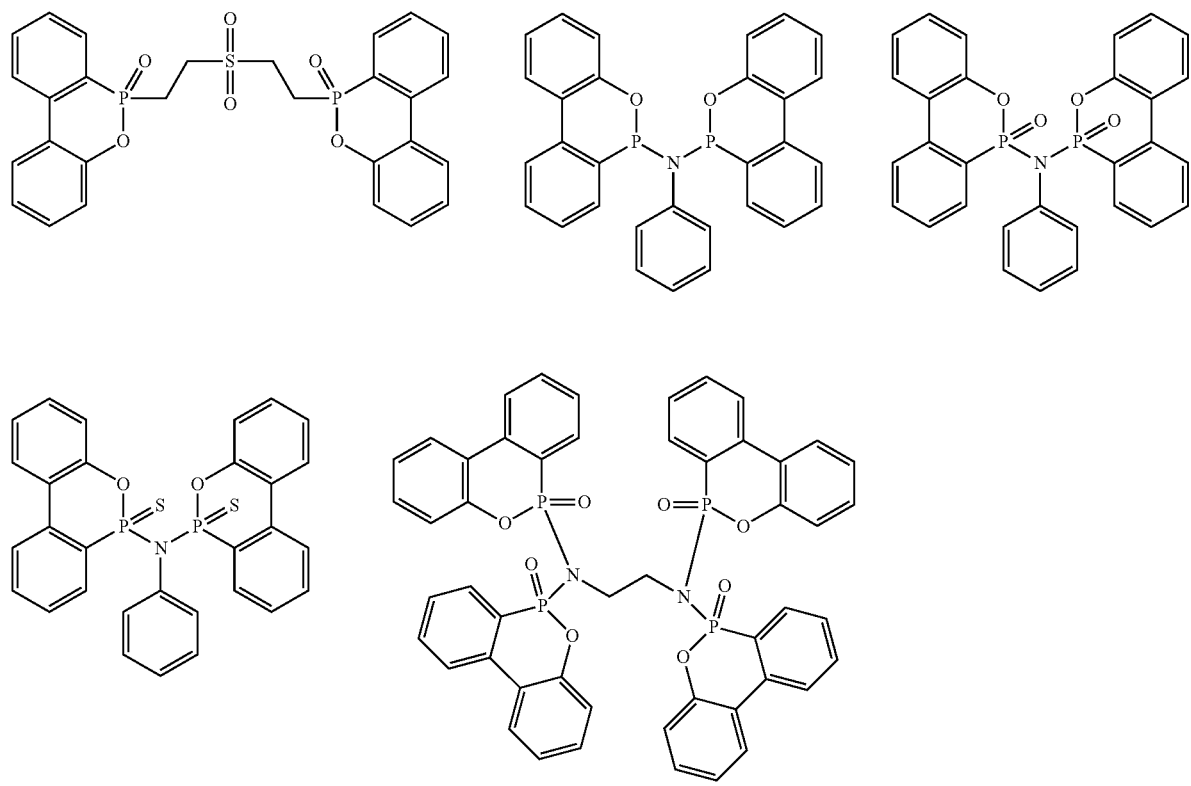

-continued
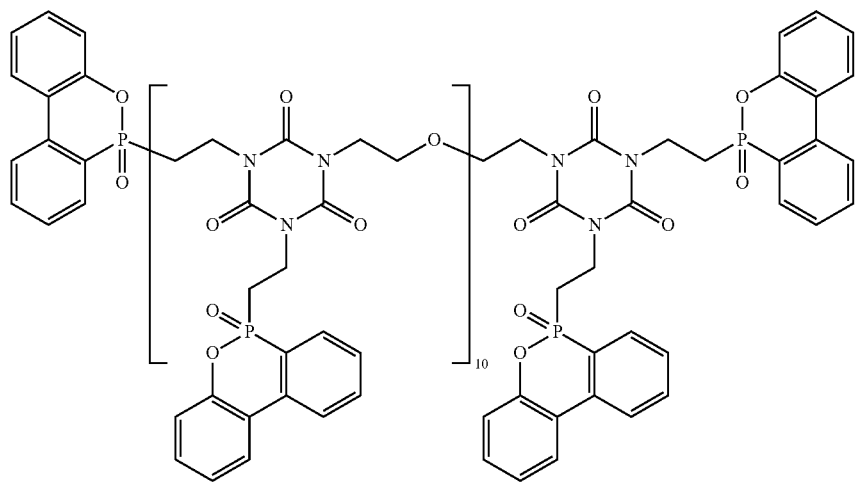
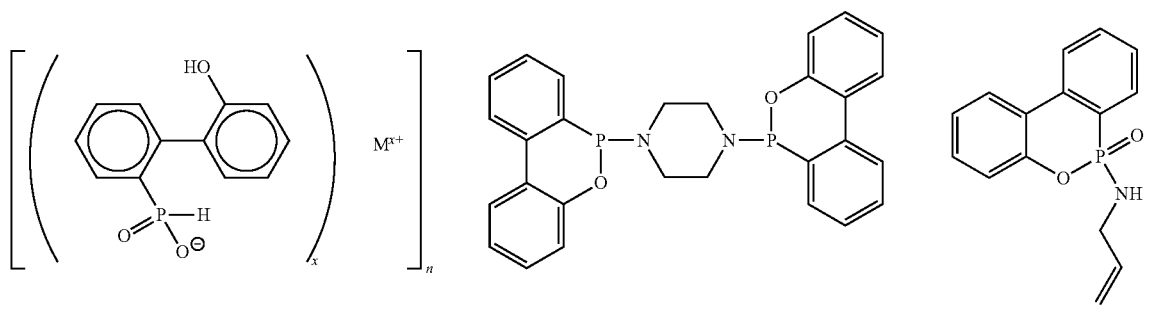
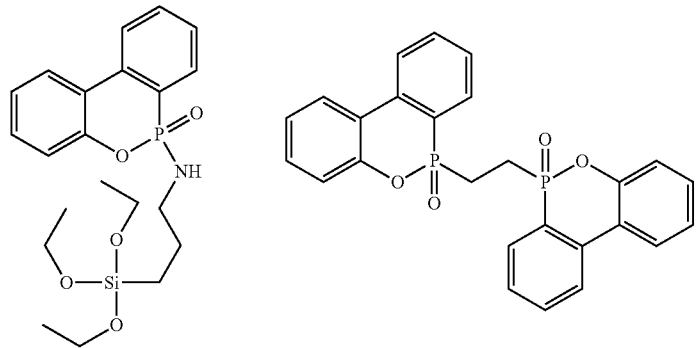
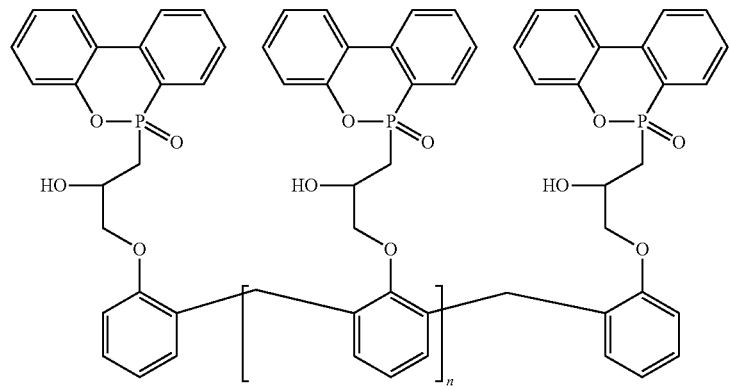

-continued

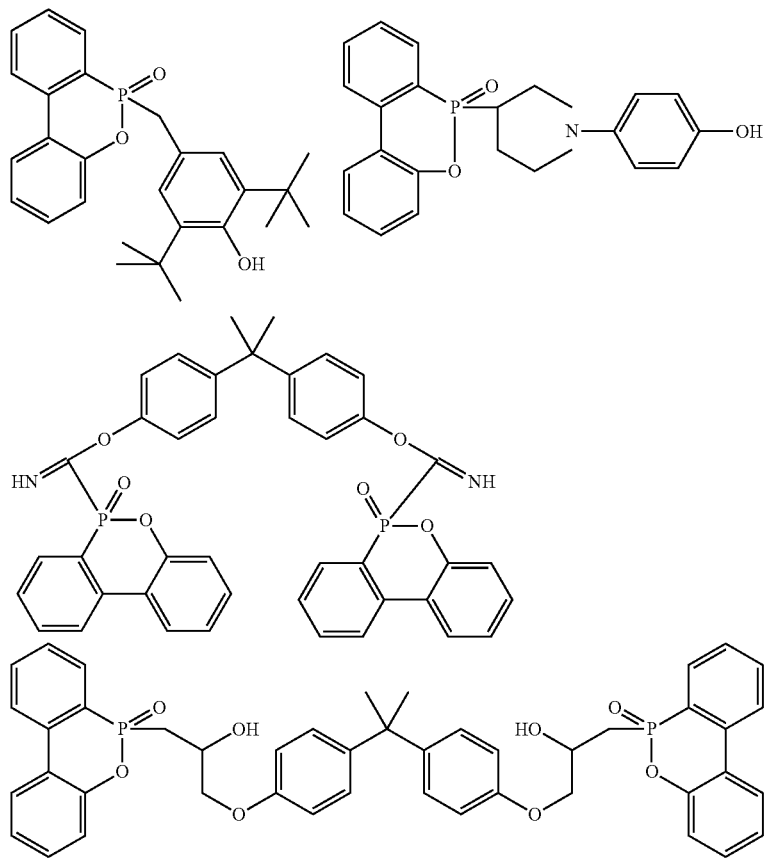

M being a metal, selected from the second, third, twelfth or thirteenth group of the periodic table of elements, x=2 or 3, n≥10, m=0-25, R=H, halogen or an aliphatic or aromatic radical with 1-32 C atoms and $R_1$=H, C1-C6 alkyl.

Products based on oxaphosphorin oxide are marketed for example under the trade name Ukanol® by Schill and Seilacher GmbH. Further compounds can be produced for example according to the patent specifications WO 2013020696, WO 2010135398, WO 03070736, WO 2006084488, WO 2006084489, WO 2011000019, WO 2013068437, WO 2013072295.

Further synergistic phosphorus-containing flame retardants are cyclic phosphonates of a structure according to one of the following formulae:

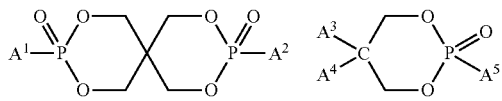

$A^1$ and $A^2$, independently of each other, representing a substituted or unsubstituted, straight-chain or branched alkyl group with 1 to 4 carbon atoms, substituted or unsubstituted benzyl, substituted or unsubstituted phenyl, substituted or unsubstituted naphthyl, and $A^3$ and $A^4$, independently of each other, being methyl or ethyl and $A^5$ being a straight-chain or branched alkyl group with 1 to 4 carbon atoms or a phenyl- or benzyl group which can have respectively up to 3 methyl groups.

Cyclic phosphonates are marketed for example by the company Thor GmbH under the trade name Aflammit® or can be produced according to EP 2450401.

Further synergistic phosphorus-containing flame retardants are phosphacenes, in particular polymeric phosphacenes. A corresponding product is available commercially e.g. under the title SPB-100 by Otsuka Chemicals.

The at least one further flame retardant can be in particular also a nitrogen-containing flame retardant. Preferred nitrogen-containing flame retardants are melamine polyphosphate, melamine cyanurate, melamine-metal phosphates, poly-[2,4-(piperazin-1,4-yl)-6-(morpholin-4-yl)-1,3,5-triazine] and ammonium polyphosphate. These compounds are commercial products and available under the trade names Melapur® by BASF SE, Budit® by Budenheim Chemische Fabrik, Exolit AP® by Clariant, Safire® by J. M. Huber Corporation or MCA PPM Triazine by MCA Technologies GmbH.

The combination of the oxyimide salts according to the invention with a phosphonate and/or a (poly)phosphacene is very particularly preferred.

In the case of the previously described combined use of the organic oxyimide salt with at least one further flame retardant, it is preferred if the weight ratio of organic oxyimide salt or of the sum of all the organic oxyimide salts used and the at least one further flame retardant is in the range of 99:1 to 1:99, preferably of 5:95 to 50:50, particularly preferably of 10:90 to 30:70.

It is likewise possible and preferred that the previously mentioned organic oxyimide salts are used in combination with at least one phosphorus-containing compound. The phosphorus-containing compound is thereby not identical to the previously mentioned phosphorus-containing flame retardants. These phosphorus-containing compounds can thereby be selected in particular from the group consisting of organic phosphites or phosphonites. Suitable compounds are then for example:

triphenylphosphite, diphenylalkylphosphites, phenyldialkylphosphites, tri(nonylphenyl)phosphite, trilaurylphosphites, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl) pentaerythritoldiphosphite, tristearylsorbitoltriphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyldibenzo[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Furthermore, it is advantageous that the organic oxyimide salts, relative to the plastic materials, are used at 0.01 to 30% by weight, preferably at 0.1 to 20% by weight, particularly preferably at 1 to 10% by weight.

In addition, the present invention relates to a flame-retardant plastic material composition, comprising or consisting of:

a) 60 to 99.9 parts by weight, preferably 60 to 98, particularly preferably 70 to 95 parts by weight, of at least one plastic material, in particular of at least one thermoplastic polymer, b) 0.1 to 40 parts by weight, preferably 1 to 25 parts by weight, particularly preferably 2.5 to 15 parts by weight, of at least one organic oxyimide salt, comprising at least one structural element of the subsequently illustrated formula I,

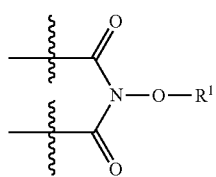

Formula I

R¹ being selected from the group consisting of inorganic or organic cations c) 0 to 25 parts by weight, preferably 1 to 20 parts by weight, particularly preferably 2.5 to 15 parts by weight, of at least one further flame retardant and also d) 0 to 25 parts by weight, preferably 1 to 20 parts by weight, particularly preferably 2.5 to 15 parts by weight, of at least one further phosphorus-containing compound.

The oxyimide salts and/or flame retardants used in the composition correspond to the above-described oxyimide salts or flame retardants. In particular, it is preferred if the flame retardant is a phosphonate or a (poly)phosphacene.

A preferred embodiment provides that the plastic material composition comprises in addition a) up to 40 parts by weight of at least one reinforcing- or filling material and/or b) up to 5 parts by weight of at least one additive from the class of phenolic antioxidants, phosphites, acid collectors, hindered amines, dispersants and also combinations hereof.

Preferably, the flame-retardant plastic material composition can comprise in addition additives, selected from the group consisting of UV absorbers, light stabilisers, stabilisers, hydroxylamines, benzofuranones, nucleation agents, impact strength enhancers, plasticisers, lubricants, rheology modifiers, processing aids, pigments, colourants, optical brighteners, antimicrobial active substances, antistatic agents, slip agents, antiblocking agents, coupling means, chain lengtheners, dispersants, compatibilisers, oxygen collectors, acid collectors, marking means or anti-fogging means. In a preferred embodiment, the compositions comprise in particular acid collectors, e.g. based on salts of long-chain acids, such as e.g. calcium stearate, magnesium stearate, zinc stearate, calcium lactate, calcium stearoyl-2-lactylate or of hydrotalcites and/or stabilisers from the group of phenolic antioxidants and phosphites and/or light stabilisers from the group of hindered amines (HALS) and/or dispersants.

Suitable light stabilisers are for example compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Suitable 2-(2'-hydroxyphenyl)benzotriazoles are for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of reesterification of 2-[3'-tert-butyl-5'-(2-methoxycarbonylethyl)-2'-hydroxyphenyl]-2H-benzotriazole with polyethylene glycol 300; [R—CH₂CH₂—COO—CH₂CH₂—]—₂, with R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl] benzotriazole.

Suitable 2-hydroxybenzophenones are for example 4-hydroxy-, 4-methoxy-, 4-octyloxy-, 4-decyloxy-4-dodecyloxy-, 4-benzyloxy, 4,2',4'-trihydroxy- and 2'-hydroxy-4,4'-dimethyoxy derivatives of 2-hydroxybenzophenones.

Suitable acrylates are for example ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are for example 4-tert-butylphenylsalicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and the mixtures thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are for example N,N'-diphenyloxamide, N-salicylal-N'-salicyloylhydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene) oxalyldihydrazide, oxanilide, isophthaloyldihydrazide, sebacoylbisphenylhydrazide, N,N'-diacetyladipolydihydrazide, N,N'-bis(salicyloyl)oxylyldihydrazide, N,N'-bis(salicyloyl)thiopropionyldihydrazide.

In particular, the following structures are suitable as metal deactivators:

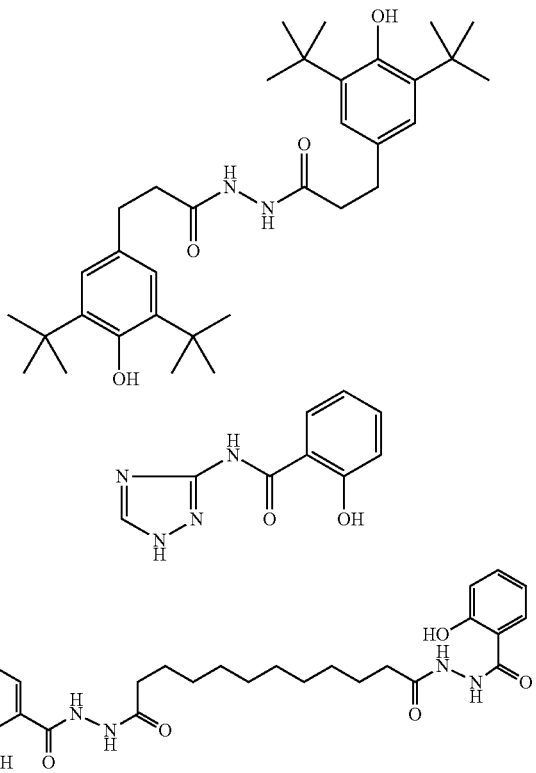

Suitable phenolic antioxidants are for example:

alkylated monophenols, such as e.g. 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols, such as e.g. 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures hereof;

alkylthiomethylphenols, such as e.g. 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones, such as e.g. 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxylphenyl)adipate;

tocopherols, such as e.g. α-, β-, γ-, δ-tocopherol and mixtures of these (vitamin E);

hydroxylated thiodiphenylethers, such as e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;

alkylidenebisphenols, such as e.g. 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6- cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds, such as e.g. 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate;

hydroxybenzylated malonates, such as e.g. dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

aromatic hydroxybenzyl compounds, such as e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds, such as e.g. 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroyphenylpropionyl)hexahydro-1,3,5-triazine, 1,3,5-tris(3,5-dicyclohexyl-4-hydroxybenzyl) isocyanurate;

benzylphosphonates, such as e.g. dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;

acylaminophenols, such as e.g. 4-hydroxylauranilide, 4-hydroxystearanilide, octyl-N-(3,5-di-tert-butyl-4-hydroxyphenyl)carbamate;

esters of β-(3,5-di-tert-butyl-4-hydroxyphenyl)propionic acid with mono- or multivalent alcohols, e.g. methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with mono- or multivalent alcohols, e.g. methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of β-(3,5-dicyclohexyl-4-hydroxyphenyl)propionic acid with mono- or multivalent alcohols, e.g. methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of 3,5-di-tert-butyl-4-hydroxyphenyl)acetic acid with mono- or multivalent alcohols, e.g. methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as e.g. N,N'-bis(3,5-di-tert-butyl-4-hydroxyphenylpropionyl)hexamethylenediamide, N,N'-bis(3,5-di-tert-butyl-4-hydroxyphenylpropionyl) hexamethylenediamide, N,N'-bis(3,5-di-tert-butyl-4-hydroxyphenylpropionyl)hexamethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, marketed by Uniroyal);

ascorbic acid (vitamin C).

Particularly preferred phenolic antioxidants are:
octadecyl-3-(3,5-di-tert-butyl-4-hydroxyphenyl)propionate, pentaerythritoltetrakis[3-(3,5-di-tert-butyl-4-hydroxyphenyl)propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propionate, N,N'-hexan-1,6-diyl-bis[3-(3,5-di-tert-butyl-4-hydroxyphenyl)propionic acid amide.

Suitable phosphites/phosphonites are for example:
triphenylphosphite, diphenylalkylphosphites, phenyldialkylphosphites, tri(nonylphenyl)phosphite, trilaurylphosphites, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6- tris(tert-butylphenyl)pentaerythritoldiphosphite, tristearyl-sorbitoltriphosphite, tetrakis(2,4-di-tert-butylphenyl)-4,4-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenzo[d,g]-1,3,2-dioxaphosphocine, 2,2'2"-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

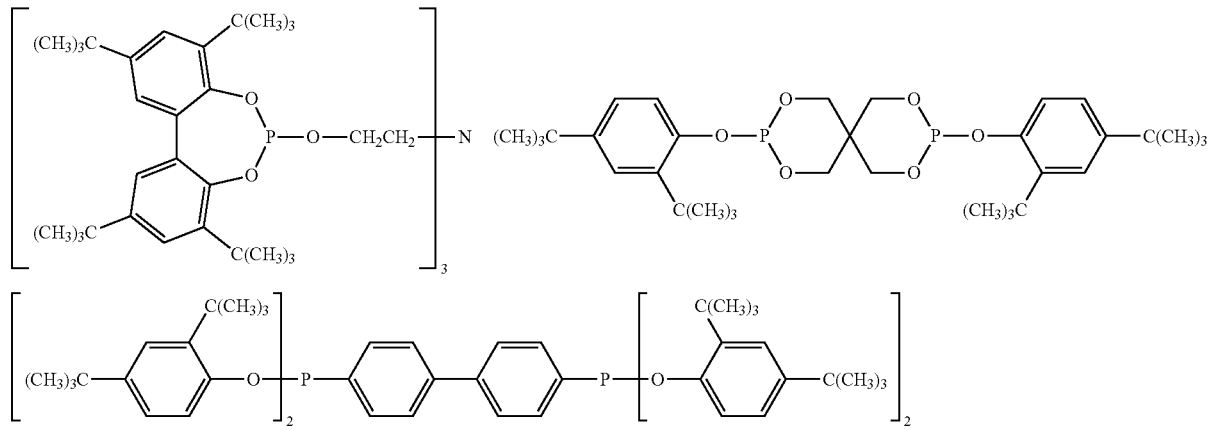

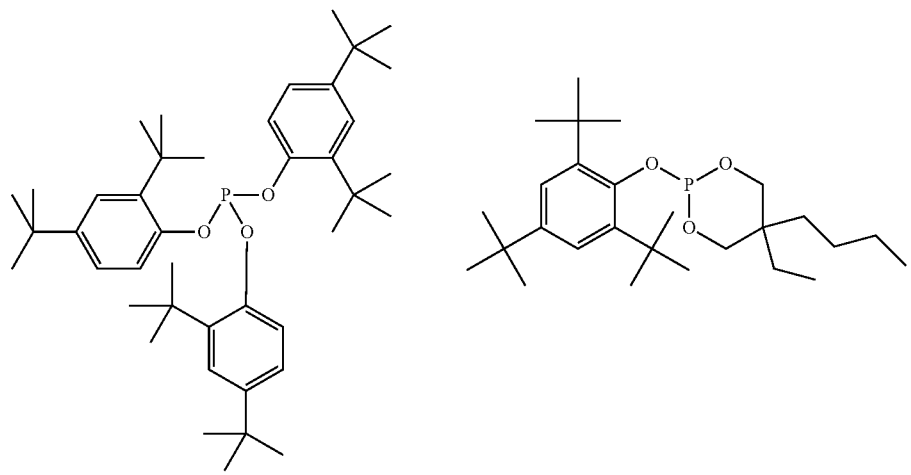

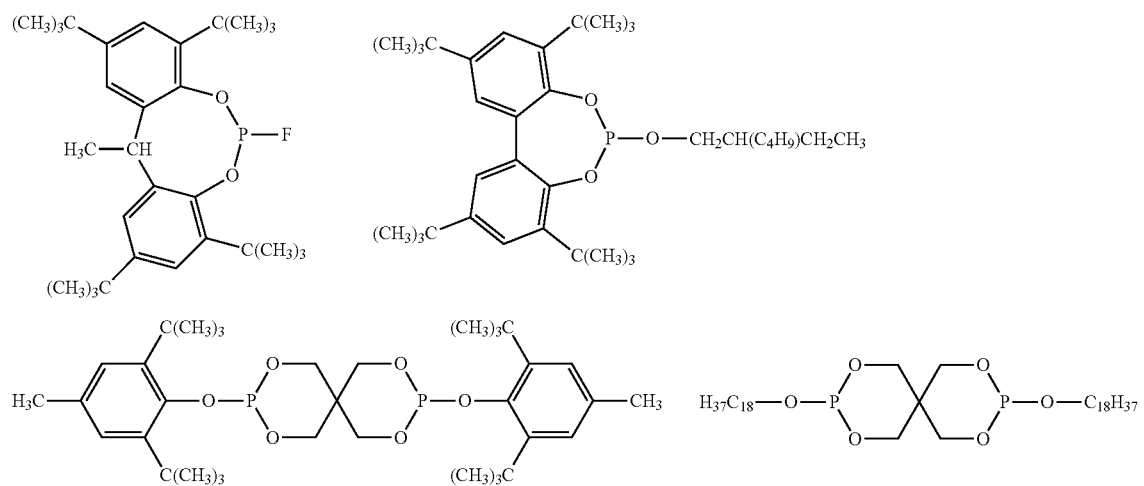

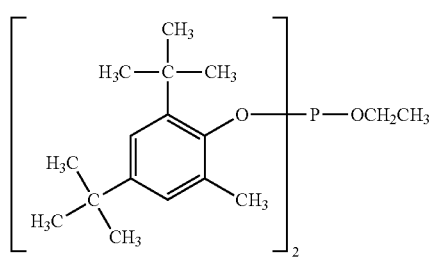 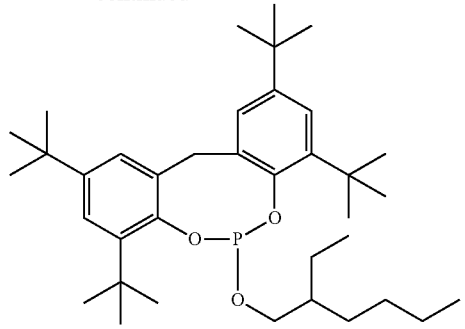

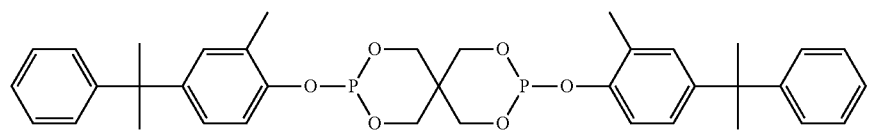

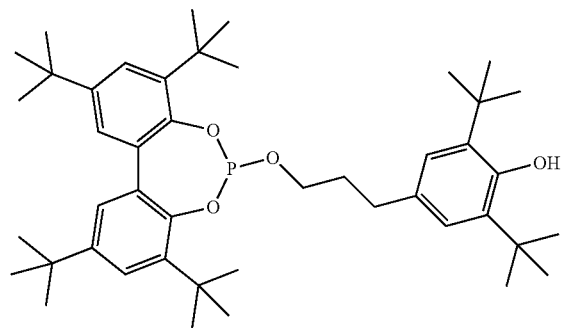

Further suitable stabilisers are aminic antioxidants. Suitable aminic antioxidants are for example:

N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N, N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N, N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Further suitable aminic antioxidants are hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-α-phenylnitron, N-octadecyl-α-hexadecylnitron, and also Genox EP (Addivant) according to the formula:

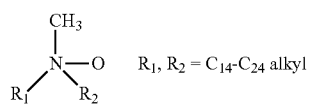

Further suitable stabilisers are thiosynergists. Suitable thiosynergists are, for example, distearylthiodipropionate, dilauryldipropionate or the compound according to the following formula:

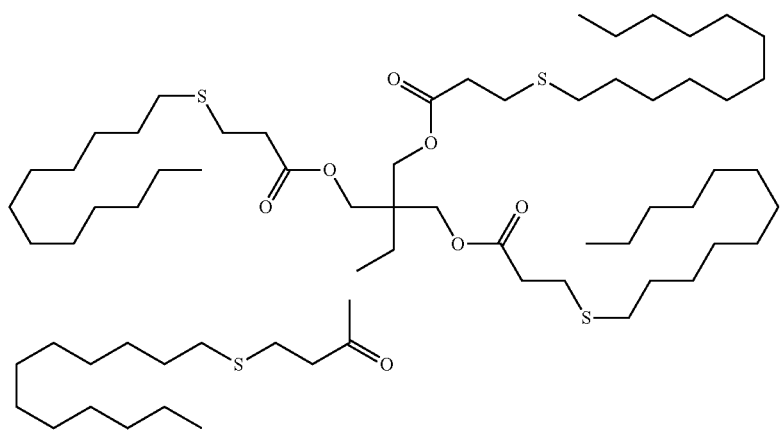

Further suitable stabilisers, in particular for polyamides, are copper salts, such as e.g. copper(I)iodide, copper(I) bromide or copper complexes, such as e.g. triphenylphosphine-copper(I) complexes.

Suitable hindered amines are for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-di-chloro-1,3,5-triazine, tris(2,2,6,6-tetramethyl-4-piperidyl)nitrilotriacetate, tetrakis (2,2,6,6-tetramethyl-4-piperidyl)-1,2,3,4-butanetetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-di-chloro-1,3,5-triazine, the reaction product of 7,7,9,9-tetramethyl-2-cycloundecyl-1-oxa-3,8-diaza-4-oxospiro-[4,5] decane and epichlorohydrin.

Suitable dispersants are for example:
polyacrylates, e.g. copolyers with long-chain side groups, polyacrylate block copolymers, alkylamides: e.g. N,N'-1,2-ethandiylbisoctadecaneamide sorbitan ester, e.g. monostearyl sorbitan ester, titanates and zirconates, reactive copolymers with functional groups, e.g. polypropylene-co-acrylic acid, polypropylene-co-maleic anhydride, polyethylene-co-glycidylmethacrylate, polystyrene-alt-maleic anhydride-polysiloxanes: e.g. dimethylsilanediol-ethylene oxide copolymer, polyphenylsiloxane copolymer, amphiphilic copolymers: e.g. polyethylene-block-polyethylene oxide, dendrimers, e.g. hydroxyl group-containing dendrimers.

Suitable nucleation agents are for example talc, alkali or alkaline earth salts of mono- and polyfunctional carboxylic acids, such as e.g. benzoic acid, succinic acid, adipic acid, e.g. sodium benzoate, zinc glycerolate, aluminium hydroxybis(4-tert-butyl)benzoate, benzylidenesorbitols, such as e.g. 1,3:2,4-bis(benzylidene)sorbitol or 1,3:2,4-bis(4-methylbenzylidene)sorbitol, 2,2'-methylene-bis-(4,6-di-tert-butylphenyl)phosphate, and also trisamides, such as e.g according to the following structures

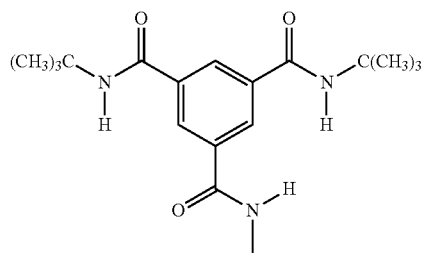

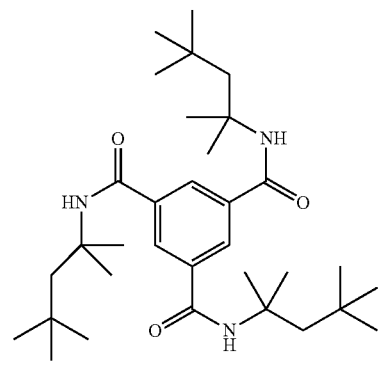

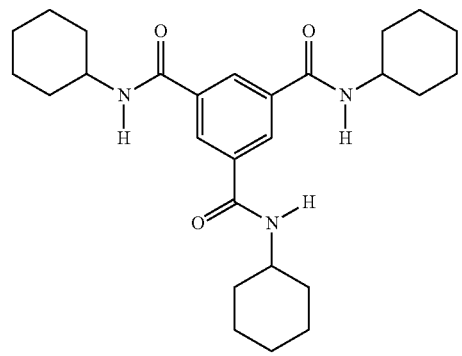

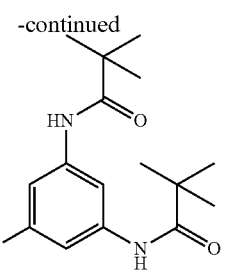

Suitable fillers and reinforcing materials are for example synthetic or natural materials, such as e.g. calcium carbonate, silicates, glass fibres, glass balls (solid or hollow), talc, mica, kaolin, barium sulfate, metal oxides and metal hydroxides, carbon black, graphite, carbon nanotubes, graphene, sawdust or fibres made of natural products, such as e.g. cellulose, synthetic fibres or metal fibres. Further suitable fillers are hydrotalcites or zeolites or layer silicates, such as e.g. montmorrillonite, bentonite, beidelite, mica, hectorite, saponite, vermiculite, ledikite, magadite, illite, kaolinite, wollastonite, attapulgite.

Suitable chain lengtheners for the linear molecular weight increase of polycondensation polymers such as polyesters or polyamides are for example diepoxides, bis-oxazolines, bizoxazolones, bis-oxazines, diiosocyanates, dianhydrides, bis-acyllactams, bis-maleimides, dicyanates, carbodiimides. Further suitable chain lengtheners are polymeric compounds, such as e.g. polystyrene-polyacrylate-polyglicidyl (meth)acrylate copolymers, polystyrene-maleic anhydride copolymers and polyethylene-maleic anhydride copolymers.

Suitable pigments can be of an inorganic or organic nature. Suitable inorganic pigments are for example titanium dioxide, zinc oxide, zinc sulfide, iron oxide, ultramarine, carbon black. Suitable organic pigments are for example anthraquinones, anthanthrones, benzimidazolones, quinacridones, diketopyrrolopyrroles, dioxazines, indanthrones, isoindolinones, azo compounds, perylenes, phthalocyanines or pyranthrones. Further suitable pigments are effect pigments based on metal or pearlescent pigments based on metal oxide.

Optical brighteners are for example bisbenzoxazoles, phenylcumarines or bis(styryl)biphenyls and in particular optical brighteners of the formulae:

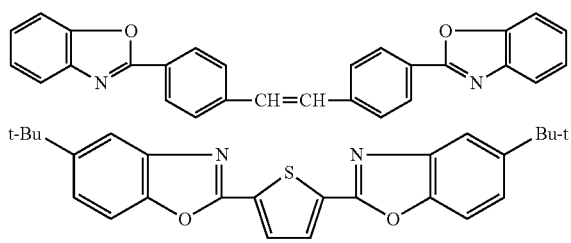

Suitable filler deactivators are for example glycidyl-based epoxides, such as e.g. bisphenol-A-diglycidyl ethers or bisphenol-F-diglycidylether and the oligomeric or polymer resins thereof, polysiloxanes, polyacrylates, in particular block copolymers, such as polymethacrylic acid-polyalkylene oxide or polystyrene-polyacacrlate-polyglycidal(meth) acrylate copolymers. Suitable antistatic agents are for example ethoxylated alkylamines, fatty acid esters, alkyl sulfonates and polymers such as e.g. polyether amides or copolymers, which comprise the salts of acrylic acid, such as e.g. polyethylene-polyacrylate-polyacrylate-Na copolymers.

Furthermore, the present invention relates to a method for the production of a flame-retardant plastic material composition, in which there is introduced a) 0.1 to 40 parts by weight, preferably 1 to 25 parts by weight, particular preferably 2.5 to 15 parts by weight, of at least one organic oxyimide salt, comprising at least one structural element of the subsequently illustrated formula I,

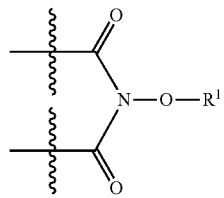

Formula I $R^1$ being selected from the group consisting of inorganic or organic cations, b) before, after or at the same time, with 0 to 25 parts by weight, preferably 2.5 to 15 parts by weight, of at least one further flame retardant and/or c) before, after or at the same time, with 0 to 25 parts by weight, preferably 1 to 20 parts by weight, particularly preferably 2.5 to 15 parts by weight, of at least one phosphorus-containing compound, in 60 to 99.9 parts by weight, preferably 60 to 98 parts by weight, particularly preferably 70 to 95 parts by weight, of at least one plastic material, in particular at least one thermoplastic polymer.

Furthermore, the present invention relates to a moulded part, paint or coating producible from a production of a previously described flame-retardant plastic material composition according to the invention, in particular in the form of injection moulded parts, foils, coatings, foams, fibres, cables and pipes, which are produced by extrusion, injection moulding, blow-moulding, pressing processes, e.g. for household and electrical appliances, vehicle parts, consumer articles, furniture, textiles.

The previously presented organic oxyimide salts according to the invention are suitable as flame retardant for thermoplastic, elastomeric and duromeric plastic materials, in particular in the form of injection moulded parts, foils or films, coatings or paints, foams, fibres, cables and pipes, profiles, hollow bodies, strips, membranes, such as e.g. geomembranes or adhesives, which are produced by extrusion, injection moulding, blow-moulding, calendering, pressing processes, spinning processes, roto-moulding or brushing and coating processes, e.g. for the electrical and electronic industry, construction industry, transport industry (car, aircraft, ship, train), for medical applications, for household and electrical appliances, vehicle parts, consumer articles, packaging, furniture, textiles. A further field of use is varnishes, paints and coatings.

For example, the compositions according to the invention can be used for marine applications (pontoons, planks, boats), auto applications (bumpers, batteries, trim parts, petrol tanks, cables, wires etc.), aircraft parts, railway parts, bicycle- and motor cycle parts, space applications, such as e.g. satellite parts, housing parts for electrical appliances, such as computers, telephones, printers, audio and video systems, plugs, printed circuits, switches, lamp shades, refrigerators, coffee machines, vacuum cleaners, rotor blades for energy production, ventilators, foils for roof constructions, building foils, pipes, such as e.g. waste water pipes and gas pipes, connection parts, drainage systems, profiles, such as e.g. window profiles or cable channels, wood composites, furniture, flooring, covering plates, artificial grass, stadium seating, carpets, nets, ropes, furniture parts, mats, garden seats, bottle crates, containers and barrels.

Incorporation of the above-described flame retardants and of the additional additives in the plastic material is effected by normal processing methods, the polymer being melted and mixed with the flame retardants and additives, preferably by mixers, kneaders and extruders. As processing machines, extruders, such as e.g. single-screw extruders, twin-screw extruders, planet roller extruders, ring extruders, co-kneaders, which are preferably equipped with vacuum degassing, are preferred. The processing can thereby be effected under air or possibly under inert gas conditions. Different flame retardants and additives can be added thereby separately or as a mixture, in the form of liquids, powders, granulates or compacted products or likewise in the form of master batches or concentrates which comprise for example 50-80% of the compositions according to the invention.

The present invention is explained in more detail with reference to the following examples, without restricting the present invention to the specially illustrated parameters.

SYNTHESIS EXAMPLES

Example 1

Synthesis of Sodium N-oxyphthalimide

Analogously to the literature (monthly journals for chemistry 137, 1591-1595 (2006)) there is added to a solution of N-hydroxyphthalimide (61.7 g; 378 mmol) in absolute ethanol (800 ml) with agitation, an equivalent quantity of sodium hydroxide (15.1 g; 378 mmol) which is subsequently heated for two hours with reflux. After cooling the solution, the formed product is filtered and washed with absolute ethanol. The product is obtained quantitatively as a red solid after drying in the vacuum oven at 100° C. for 12 hours.

$^1$H-NMR (500 MHz, D2O); δ=7.49 (dd, J=5.3, 3.0 Hz, 1H), 7.35 (dd, J=5.3, 3.0 Hz, 1H) ppm.

$^{13}$C-NMR (126 MHz, D2O); δ=169.11, 133.29, 129.08, 121.44 ppm.

Example 2

Synthesis of an N-oxyphthalimide Zinc Salt

To a solution of sodium N-oxyphthalimide (5.97 g; 32.2 mmol) in $H_2O$ (400 ml), zinc nitrate hexahydrate (4.8 g; 16.1 mmol) is added with agitation. After approx. half an hour, an orange-coloured precipitate is formed, whereupon the dispersion is stored for a further 12 hours at room temperature. The product is subsequently filtered off via a Büchner funnel, washed with $H_2O$ (100 ml) and dried at 140° C. for 12 hours under vacuum.

$^1$H-NMR (300 MHz, DMSO-$d_6$); δ=7.74-7.40 (m, 1H).

Example 3

Synthesis of an N-oxyphthalimide Melaminium Salt

To a solution of melamine (10 g; 79.3 mmol) in hot $H_2O$ (200 ml), N-hydroxyphthalimide (12.93; 79.3 mmol) is added and the mixture thereupon heated for 3 hours with reflux. Subsequently, the mixture is stored for a further 12 hours at room temperature. The orange-coloured product is thereupon filtered off via a Büchner funnel, washed with $H_2O$ (100 ml) and dried for 12 hours at 140° C. under vacuum.

$^1$H-NMR (300 MHz, DMSO-d6); δ=7.82 (s, 1H), 6.23 (s, 1H).

Example 4

Synthesis of an N-oxyphthalimide Polyvinyl Diaminotriazine Salt

To a dispersion of poly-2-vinyl-4,6-diamino-1,3,5-triazine (5 g; 36.5 mmol) in hot $H_2O$ (50 ml), N-hydroxyphthalimide (5.95 g; 36.5 mmol) is added with agitation and the dispersion heated for 3 hours with reflux. Subsequently, the mixture is stored for a further 12 hours at room temperature. The yellowish and insoluble product is thereupon filtered off via a Büchner funnel and subsequently dried at 140° C. for 12 hours under vacuum.

Production and Testing of a Flame-Retardant Plastic Material Mixture According to the Invention The extrusions of the polypropylene samples (DOW C766-03) are effected at a temperature of 190° C. and a screw speed of rotation of 150 rpm on an 11 mm twin-screw extruder (Process 11 of Thermo Scientific). The desired ratio of polymer and additives is firstly homogenised by mixing and supplied to the extrusion via volumetric metering.

Test pieces for the fire test are produced from the granulate at a temperature of 220° C. and a pressure of 2 t using a hydraulic 10 t press (Werner & Pfleiderer). For this purpose, the granulate is filled into the compression mould and this is transferred into the already preheated press. At a pressure of 0.5 t, the granulate is firstly melted for 60 s. After expiry of the melting time, the pressure is increased to 2 t and kept constant for a further 3 min. Whilst maintaining the contact pressure, the mould is cooled to 60° C. and thereafter the test pieces are removed. The test pieces have the following dimensions according to the standard: 127.5×12.5×1.5.

The examples and comparative examples according to the invention contained in Table 1 were tested according to DIN EN 60695-11-10 and the burning times and classification according to the standard were obtained:

TABLE 1

Compositions in polypropylene and results of the fire test

| Example | Composition Flame retardant | Burning times Total of the secondary burning times of 5 test pieces with 2 flame impingements [in seconds] | Classification according to DIN EN 60695-11-10 |
|---|---|---|---|
| Comparative example 1 (state of the art) | 15% diethyl-aluminium phosphinate | >200 | Not classified |
| Comparative example 2 | 20% diethyl-aluminium phosphinate | 170 | not classified |

TABLE 1-continued

Compositions in polypropylene and results of the fire test

| Example | Composition Flame retardant | Burning times Total of the secondary burning times of 5 test pieces with 2 flame impingements [in seconds] | Classification according to DIN EN 60695-11-10 |
|---|---|---|---|
| Example 3 according to the invention | 15% diethyl-aluminium phosphinate 2% sodium N-oxyphthalimide (example 1) | 30.9 | V-2 |
| Example 4 according to the invention | 8% phosphonate + 2% sodium N-oxyphthalimide (example 1) | 54.4 | V-2 |
| Example 5 according to the invention | 15% diethyl-aluminium phosphinate 2% zinc salt (example 2) | 27.2 | V-2 |
| Example 6 according to the invention | 15% diethyl-aluminium phosphinate 2% melaminium salt (example 3) | 27 | V-2 |
| Example 7 according to the invention | 10% phosphazene 5% melaminium salt (example 3) | 4.2 | V-2 |
| Example 8 according to the invention | 15% diethyl-aluminium phosphinate 2% polyvinyl diaminotriazine salt (example 4) | 33.3 | V-2 |

Phosphazenes (SBP-100, Otsuka Chemical Co., Ltd.)
Aluminium diethylphosphinate (Exolit OP 1230, Clariant SE)
Phosphonate (Aflammit PCO 900, Thor GmbH)

The examples according to the invention are self-extinguishing after removal of the source of ignition and have surprisingly reduced burning times relative to the comparative example, a classification according to V-2 is obtained.

The invention claimed is:

1. A method for imparting flame retardancy to a plastic material comprising incorporating an organic oxyimide salt having at least one structural element of formula I

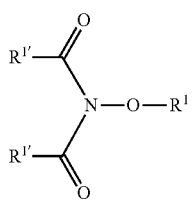

formula I wherein $R^1$ is selected from the group consisting of inorganic cations, organic cations, and combinations thereof, into the plastic material; wherein
$R^1$ is ionically bonded to the remainder of the structural element of formula I; and wherein
$R^{1'}$, upon each occurrence, is the same or different and is a linear or branched alkyl radical, a linear or branched alkylene radical, an aromatic radical, a heteroaromatic radical or both radicals $R^{1'}$ are joined to form a ring, the ring being saturated or unsaturated, substituted or unsubstituted and/or at least one or both radicals $R^{1'}$ or the radicals $R^{1'}$ are joined to form a ring comprising at least one further structural element of formula I.

2. The method according to claim 1, wherein the organic oxyimide salt
   a) comprises a structural element of formula I and has a structure according to one of the formulae:

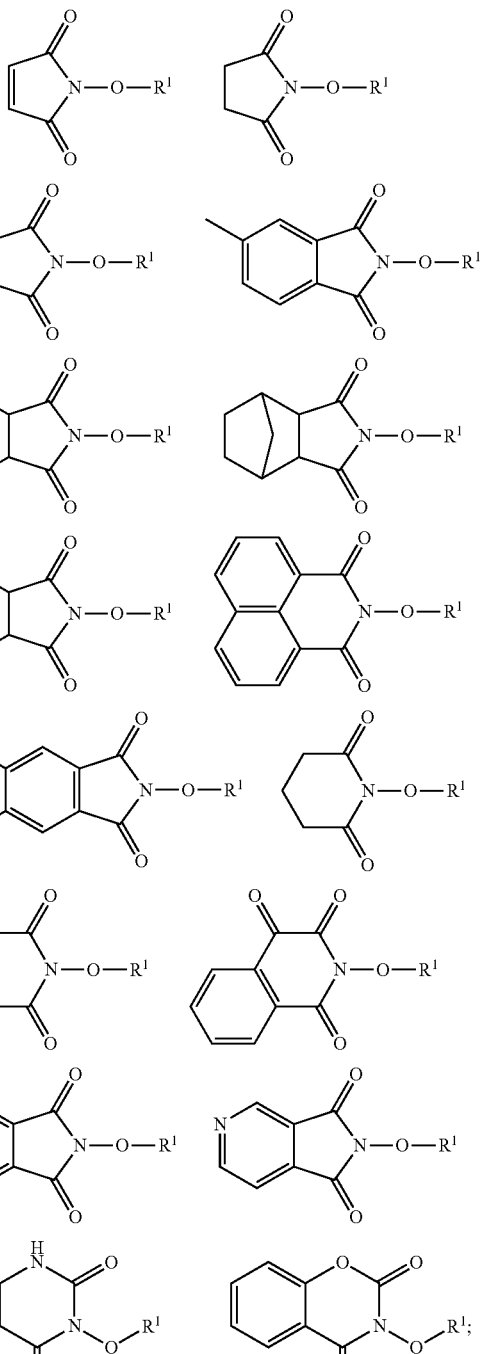

b) comprises a structural element of formula I and has a structure according to one of the subsequent formulae:

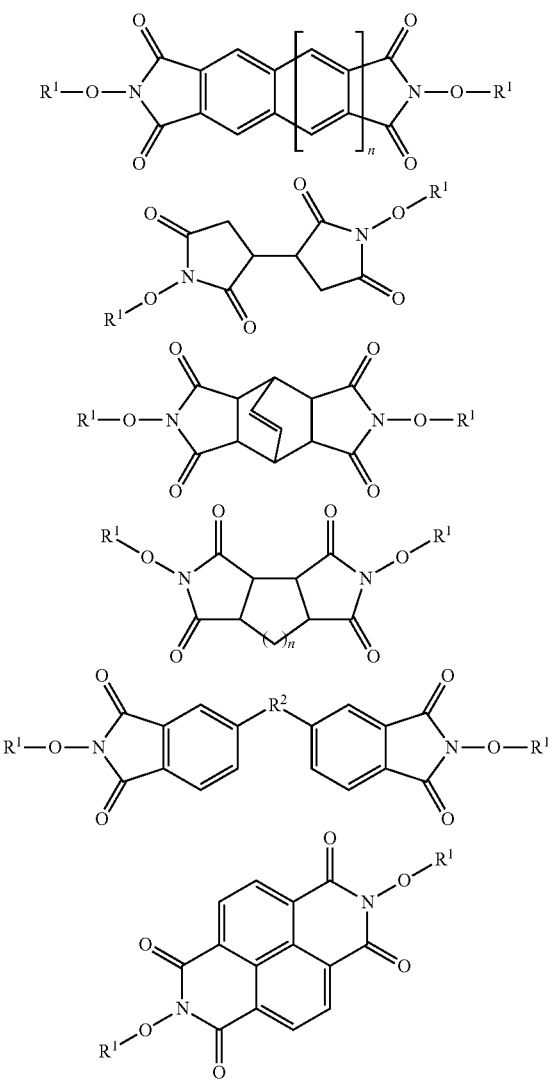

wherein
n is 0, 1, 2, 3 or 4, and
R² is selected from the group consisting of optionally substituted alkylene-, cycloalkylene-, arylene-, heteroarylene- or bridging acyl-radicals; or
c) comprises three structural elements of formula I and has a structure according to the formula

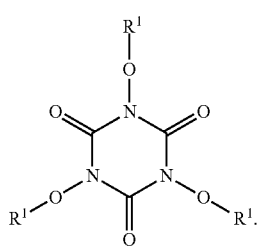

3. The method according to claim 2, wherein R² is selected from the group consisting of —(CH₂)ₙ— with n=1 to 18, —CH(CH₃)—, —C(CH₃)₂—, —CH(CF₃)—, —O—, —S—, —SO₂—, —NHCO—, —CO—, and —OC(O)O— and groups

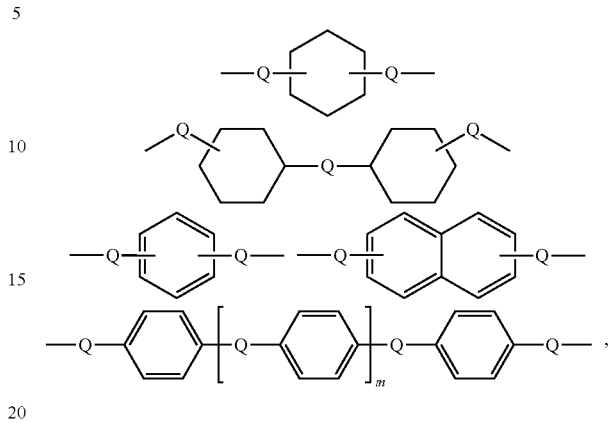

wherein
the cycloaliphatic or aromatic ring systems contained in the above groups are unsubstituted or substituted by one or more alkyl- and/or alkoxy groups,
Q upon each occurrence, is the same or different and is selected from the group consisting of a chemical bond, —(CH₂)ₙ— with n=1 to 18, —CH(CH₃)—, —C(CH₃)₂—, —CH(CF₃)—, —C(CF₃)₂—, —O—, —S—, —SO₂—, —NHCO—, —CO—, and —C(O)—O—, and
m is 0 or 1 to 3.

4. The method according to claim 1, wherein the plastic material is selected from the group consisting of
a) polymers made of olefins or diolefins,
b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile-acrylate (ASA), styrene-ethylene, styrene-maleic anhydride polymers and graft copolymers made of methylmethacrylate, styrene-butadiene and ABS (MABS),
c) halogen-containing polymers,
d) polymers of unsaturated esters,
e) polymers made of unsaturated alcohols and derivatives thereof,
f) polyacetals,
g) polyphenylene oxides and blends with polystyrene or polyamides,
h) polymers of cyclic ethers,
i) polyurethanes made of hydroxy-terminated polyethers or polyesters and aromatic or aliphatic isocyanates,
j) polyamides,
k) polyimides, polyamideimides, polyetherimides, polyesterimides, poly(ether)ketones, polysulfones, polyethersulfones, polyarylsulfones, polyphenylenesulfides, polybenzimidazoles, or polyhydantoins,
l) polyesters made of aliphatic or aromatic dicarboxylic acids and diols or made of hydroxycarboxylic acids,
m) polycarbonates, polyestercarbonates and blends thereof,
n) cellulose derivatives,
o) elastomeric, thermoplastic, non-thermoplastic, and duroplastic materials, and
p) mixtures, combinations, or blends thereof.

5. The method according to claim 1, which includes incorporating at least one further flame retardant selected from the group consisting of
   a) inorganic flame retardants,
   b) nitrogen-containing flame retardants,
   c) radical formers,
   d) phosphorus-containing flame retardants,
   e) halogen-containing flame retardants based on chlorine and bromine, optionally in combination with $Sb_2O_3$ and/or $Sb_2O_5$,
   f) borates,
   g) sulfur-containing compounds,
   h) antidrip agents,
   i) silicon-containing compounds, and
   j) combinations or mixtures thereof.

6. The method according to the claim 5, wherein the radical formers are selected from the group consisting of
   a) N-alkoxyamines according to the structural formula,

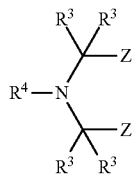

wherein
$R^3$ is hydrogen or an optionally substituted alkyl-, cycloalkyl-, aryl-, heteroaryl- or acyl-radical,
$R^4$ is an alkoxy-, aryloxy-, cycloalkoxy-, aralkoxy- or acyloxy-radical, and
Z is hydrogen or an optionally substituted alkyl-, cycloalkyl-, aryl-, heteroaryl- or acyl-radical, the two radicals Z also being able to form a closed ring which is substituted optionally by ester-, ether-, amine-, amide-, carboxy- or urethane-groups,
   b) azo compounds according to the structural formula,

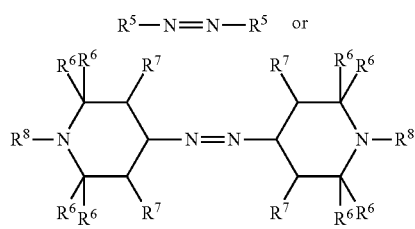

wherein
$R^5$ is an alkyl-, cycloalkyl- or aryl-radical,
$R^6$ upon each occurrence, is the same or different and is a linear or branched alkyl-radical,
$R^7$ upon each occurrence, is the same or different and is hydrogen or a linear or branched alkyl-radical, and
$R^8$ upon each occurrence, is the same or different and is an alkyl-, alkoxy-, aryloxy-, cycloalkyloxy-, aralkoxy- or acyloxy-radical,
   c) dicumyl compounds according to the structural formula

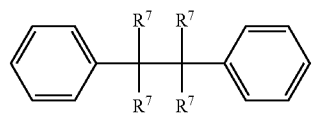

wherein $R^7$ upon each occurrence, is the same or different and is hydrogen or a linear or branched alkyl-radical,
   d) and/or a polycumyl compound according to the structural formula

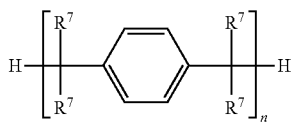

wherein
$R^7$ upon each occurrence, is the same or different and is hydrogen or a linear or branched alkyl-radical, and $2<n<100$.

7. The method according to claim 5, wherein the organic oxyimide salt and the at least one further flame retardant are incorporated in a weight ratio of 99:1 to 1:99.

8. The method according to claim 1, wherein the organic oxyimide salt is incorporated in combination with at least one phosphorus-containing compound.

9. The method according to claim 1, wherein the organic oxyimide salt, relative to the plastic material is incorporated at 0.01 to 30% by weight.

10. A flame-retardant plastic material composition, comprising or consisting of:
   a) 60 to 99.9 parts by weight of at least one plastic material,
   b) 0.1 to 40 parts by weight of at least one organic oxyimide salt, comprising at least one structural element of the formula I, formula I

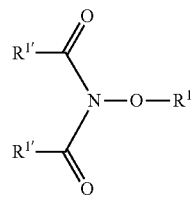

$R^1$ being selected from the group consisting of inorganic and organic cations, wherein $R^1$ is ionically bonded to the remainder of the structural element of formula I, and
$R^{1'}$, upon each occurrence, is the same or different and is a linear or branched alkyl radical, a linear or branched alkylene radical, an aromatic radical, a heteroaromatic radical or both radicals $R^{1'}$ are joined to form a ring, the ring being saturated or unsaturated, substituted or unsubstituted and/or at least one or both radicals $R^{1'}$ or the radicals $R^{1'}$ are joined to form a ring comprising at least one further structural element of formula I,
   c) 0 to 25 parts by weight of at least one further flame retardant, and
   d) 0 to 25 parts by weight, of at least one further phosphorus-containing compound.

11. The flame-retardant plastic material composition according to claim 10, which further includes
   a) up to 40 parts by weight of at least one reinforcing- or filling material and/or b) up to 5 parts by weight of at least one additive selected from the class of phenolic antioxidants, phosphites, acid collectors, hindered amines, dispersants, and combinations thereof.

12. The flame-retardant plastic material composition according to claim 10, which includes one or more additives selected from the group consisting of UV absorbers, light stabilisers, stabilisers, hydroxylamines, benzofuranones, nucleation agents, impact strength enhancers, plasticisers, lubricants, rheology modifiers, processing aids, pigments, colourants, optical brighteners, antimicrobial active substances, antistatic agents, slip agents, antiblocking agents, coupling means, dispersants, compatibilisers, oxygen collectors, acid collectors, marking means and anti-fogging means.

13. A method for the production of a flame-retardant plastic material composition, comprising introducing into the plastic material
   a) 0.1 to 40 parts by weight of at least one organic oxyimide salt, comprising at least one structural element of the subsequently illustrated formula I,

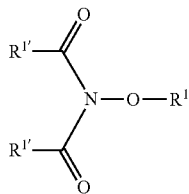

formula I $R^1$ being selected from the group consisting of inorganic cations, organic cations, and combinations thereof, wherein $R^1$ is ionically bonded to the remainder of the structural element of formula I, and $R^{1'}$, upon each occurrence, is the same or different and is a linear or branched alkyl radical, a linear or branched alkylene radical, an aromatic radical, a heteroaromatic radical or both radicals $R^{1'}$ are joined to form a ring, the ring being saturated or unsaturated, substituted or unsubstituted and/or at least one or both radicals R' or the radicals $R^{1'}$ are joined to form a ring comprising at least one further structural element of formula I, b) before, after or at the same time, introducing 0 to 25 parts by weight, of at least one further flame retardant and/or c) before, after or at the same, introducing 0 to 25 parts by weight, of at least one phosphorus-containing compound, in 60 to 99.9 parts by weight, of at least one plastic material.

14. A moulded part, paint, or coating comprising a flame-retardant plastic material composition according to claim 10.

15. The moulded part, paint, or coating according to claim 13, which is an injection moulded part, foil, coating, foam, fibre, cable or pipe, which is produced by an extrusion, injection moulding, blow-moulding, or pressing process.

* * * * *